(12) United States Patent
Argaw et al.

(10) Patent No.: US 11,097,976 B2
(45) Date of Patent: Aug. 24, 2021

(54) VACUUM SLOW COOLING DEVICE FOR OPTICAL FIBER DRAW

(71) Applicant: CORNING INCORPORATED, Corning, NY (US)

(72) Inventors: Yacob Mesfin Argaw, Painted Post, NY (US); Nikolaos Pantelis Kladias, Horseheads, NY (US); Robert Clark Moore, Wilmington, NC (US); Bruce Warren Reding, Corning, NY (US); Chunfeng Zhou, Painted Post, NY (US)

(73) Assignee: Corning Incorporated, Corning, NY (US)

(*) Notice: Subject to any disclaimer, the term of this patent is extended or adjusted under 35 U.S.C. 154(b) by 9 days.

(21) Appl. No.: 16/418,075

(22) Filed: May 21, 2019

(65) Prior Publication Data

US 2019/0359517 A1 Nov. 28, 2019

Related U.S. Application Data

(60) Provisional application No. 62/675,300, filed on May 23, 2018.

(51) Int. Cl.
*C03B 37/027* (2006.01)

(52) U.S. Cl.
CPC .............................. *C03B 37/02727* (2013.01)

(58) Field of Classification Search
CPC ............ C03B 37/02727; C03B 37/032; C03B 37/02718; C03B 2205/09; C03B 2205/42
See application file for complete search history.

(56) References Cited

U.S. PATENT DOCUMENTS

| 6,125,638 A | 10/2000 | Ji et al. |
| 7,937,971 B2 | 5/2011 | Costello, III et al. |

(Continued)

FOREIGN PATENT DOCUMENTS

| CN | 105819679 A | 8/2016 | |
| CN | 108025943 A * | 5/2018 | ....... C03B 37/02727 |

(Continued)

OTHER PUBLICATIONS

Potkay et al; "A Low-Power Pressure- and Temperature-Programmable GC"; Solid State Sensors, Actuators, and Microsystems Workshop, (2006) pp. 144-147.

(Continued)

*Primary Examiner* — Thomas A Hollweg
*Assistant Examiner* — Mary A El-Shammaa
(74) *Attorney, Agent, or Firm* — Kevin L. Bray

(57) ABSTRACT

A method of processing an optical fiber includes drawing the optical fiber from a heated glass source, reheating the optical fiber, and cooling the optical fiber under vacuum at a cooling rate less than the cooling rate of the optical fiber in air at 25° C. and 1 atm. Cooling the optical fiber under vacuum is conducted after reheating the optical fiber. Cooling the optical fiber under vacuum reduces the rate of heat transfer from the optical fiber, which may enable further relaxation of the glass and reduction in the fictive temperature of the optical fiber. A system for processing an optical fiber includes a furnace containing a fiber preform, a first positioner, a reheating device, and a treatment device downstream of the reheating device, the treatment device operable to cool the optical fiber under vacuum to reduce the rate of heat transfer from the optical fiber.

16 Claims, 9 Drawing Sheets

(56) References Cited

U.S. PATENT DOCUMENTS

| | | | |
|---|---|---|---|
| 2004/0107736 A1 | 6/2004 | Schuepbach et al. | |
| 2007/0022786 A1 | 2/2007 | Foster et al. | |
| 2011/0289979 A1 | 12/2011 | Faler et al. | |
| 2014/0096565 A1 | 4/2014 | Gregorski et al. | |
| 2016/0152504 A1 | 6/2016 | Ono et al. | |
| 2017/0073265 A1 | 3/2017 | Bookbinder et al. | |
| 2017/0217822 A1 | 8/2017 | Imase | |
| 2017/0285259 A1* | 10/2017 | Nagasu | C03C 13/04 |
| 2017/0297947 A1 | 10/2017 | Billings et al. | |
| 2018/0171142 A1* | 6/2018 | Otsuka | C08K 5/134 |
| 2019/0270847 A1* | 9/2019 | Alidedeoglu | C08G 63/183 |

FOREIGN PATENT DOCUMENTS

| | | | | |
|---|---|---|---|---|
| CN | 108698905 A | * | 10/2018 | G02B 6/02 |
| JP | 2008308361 A | | 12/2008 | |
| JP | 2012171829 A | | 9/2012 | |
| WO | WO-2018118967 A1 | * | 6/2018 | C07K 14/70575 |

OTHER PUBLICATIONS

Tsujikawa et al; "Intrinsic Loss of Optical Fibers." Optical Fiber Technology, 11(4): 319-331 (2005.

Tsujikawa et al; "Rayleigh Scattering Reduction Method for Silica-Based Optical Fiber" J. Lightwave Technology, 18(11): 1528 (2000.

International Search Report and Written Opinion of the European Searching Authority; PCT/US2019/032581; dated Aug. 21, 2019; 13 Pgs.

\* cited by examiner

VACUUM SLOW COOLING DEVICE FOR OPTICAL FIBER DRAW

This application claims the benefit of priority to U.S. Provisional Application Ser. No. 62/675,300 filed on May 23, 2018, the content of which is relied upon and incorporated herein by reference in its entirety.

BACKGROUND

Field

The present specification generally relates to methods and systems for forming optical fibers, in particular, to methods for forming and cooling optical fibers.

Technical Background

In the manufacturing of optical fibers, optical preforms are heated to temperatures much greater than the glass softening point, and the optical preform is then drawn at large draw down ratios to form optical fibers. Due to the high draw temperatures, large draw down ratios and fast draw speeds, the glass of the fiber is far from the equilibrium state, resulting in fibers with high fictive temperature. High fictive temperature is undesirable for fibers used for transmission of optical signals because high fictive temperature is known to correlate with increased signal attenuation. To reduce signal attenuation in transmission fibers, processing conditions may be modified to produce fibers with lower fictive temperature. Efforts to reduce fictive temperature have emphasized slow cooling of the fiber to stabilize the fiber in a state closer to the equilibrium state. Prolonged cooling of the fiber in a critical temperature regime in the glass transition region of the fiber is one strategy for reducing fiber fictive temperature. However, the extent to which fiber fictive temperature can be reduced in existing fiber processing systems is limited because the residence times of the fiber at temperatures within the critical temperature regime are too short (e.g., <0.2 sec) to permit significant relaxation of the structure of the glass of the fiber. Because of the short residence time, the structure of the glass of the fiber remains far from the equilibrium state and only a modest decrease in fictive temperature can be achieved.

SUMMARY

Accordingly, a need exists for systems and methods for optical fiber processing that enables production of optical fibers having reduced fictive temperatures and reduced attenuation.

In one or more aspects of the present disclosure, a method for processing an optical fiber may include drawing the optical fiber from a heated glass source, positioning the optical fiber, reheating the optical fiber after positioning the optical fiber, and cooling the optical fiber after reheating the optical fiber. Reheating and cooling the optical fiber may be conducted under vacuum, and cooling may be conducted at a cooling rate less than the cooling rate of the optical fiber in air at 25° C. and 1 atm. In some embodiments, the vacuum may have a pressure of from 0.005 atmospheres (atm) to 0.8 atm. In some embodiments, the method may include positioning the optical fiber under vacuum at a pressure of from 0.005 atm to 0.8 atm.

In some embodiments of the method, cooling the optical fiber under vacuum may include passing the optical fiber through a chamber of a treatment device. The chamber may be maintained at a pressure of from 0.005 atm to 0.8 atm as the optical fiber passes through the chamber. At least a portion of the treatment device downstream of a reheating device may have an inner diameter of from 4 cm to 40 cm. In some embodiments, the positioner for positioning the optical fiber may be disposed within the chamber of the treatment device.

In some embodiments, the method may further include reducing a temperature gradient between the treatment device and the optical fiber by heating an internal surface of the treatment device. In some embodiments, the method may further include introducing a working gas to the treatment device, the working gas having a thermal conductivity less than the thermal conductivity of air. In some embodiments, the working gas may be argon. The optical fiber passed out of the treatment device may have a temperature of greater than 500° C.

In some embodiments of the method, positioning the optical fiber may include passing the optical fiber over at least one fluid bearing. In some embodiments, positioning the optical fiber may include changing a direction of the process pathway of the optical fiber drawn from the heated glass source. In some embodiments, the method may include passing the optical fiber through a heated slow-cooling device before positioning the optical fiber.

In one or more other aspects of the present disclosure, a system for processing an optical fiber may include a furnace having a fiber preform operable to produce an optical fiber, at least one positioner downstream of the furnace, the positioner operable to reduce variability in a process pathway of the optical fiber, and a treatment device downstream of the positioner. The treatment device may further include a reheating zone and a treatment zone downstream of the reheating zone. The treatment device may be operable to maintain the reheating zone and treatment zone at an operating pressure less than atmospheric pressure and to cool the optical fiber in the treatment zone under vacuum at a cooling rate less than a cooling rate of the optical fiber in air at 25° C. and 1 atm. The system may further include a reheating device coupled to or enclosed within the reheating zone of the treatment device. The treatment device may be operable to maintain the optical fiber at a pressure of from 0.005 atm to 0.8 atm in the treatment zone.

In some embodiments, the treatment device may include a chamber enclosing at least a portion of the process pathway of the optical fiber downstream of the reheating device. The chamber may have an inner diameter of from 4 cm to 40 cm. In some embodiments of the system, the treatment device may enclose the positioner upstream of the reheating device. In some embodiments, the treatment device may include a heated internal surface in the treatment zone. The heated internal surface may be operable to reduce a temperature gradient between the optical fiber and the treatment device. In some embodiments, the system may further include a heated slow cooling device disposed between the furnace and the positioner.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
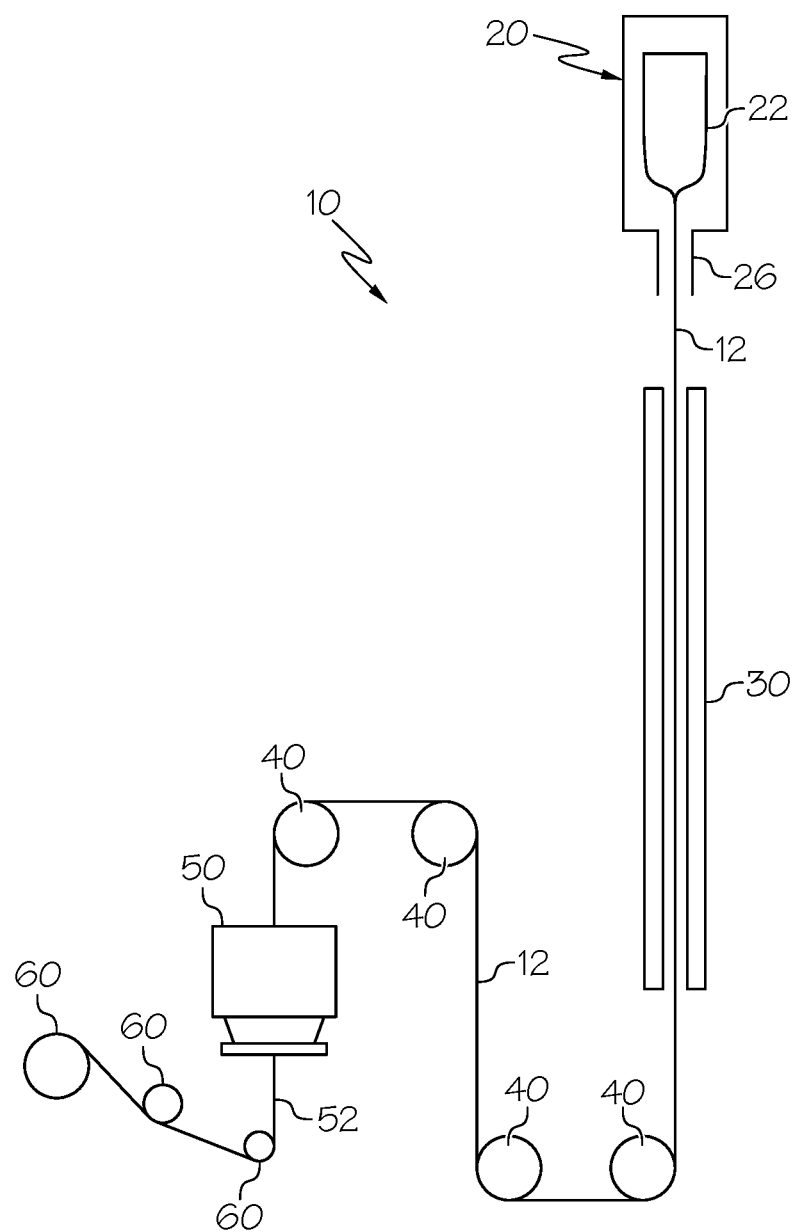
FIG. 1 schematically depicts a prior art process for producing an optical fiber.

The present disclosure is directed to systems and methods for processing optical fibers. Reference will now be made in detail to embodiments of the methods for processing optical fibers, examples of which are illustrated in the accompanying drawings. Whenever possible, the same reference numerals will be used throughout the drawings to refer to the same or like parts.

As used herein, the term "process pathway" refers to the pathway that the optical fiber follows from the draw furnace (e.g., furnace 20) through a plurality of processes and/or devices. The term "downstream" refers to a relative position of a process or device on the process pathway that is farther away from the draw furnace along the process pathway compared to another process or device. Likewise, the term "upstream" refers to a relative position of a process or device on the process pathway that is closer to the draw furnace along the process pathway compared to another process or device.

Figure 2:
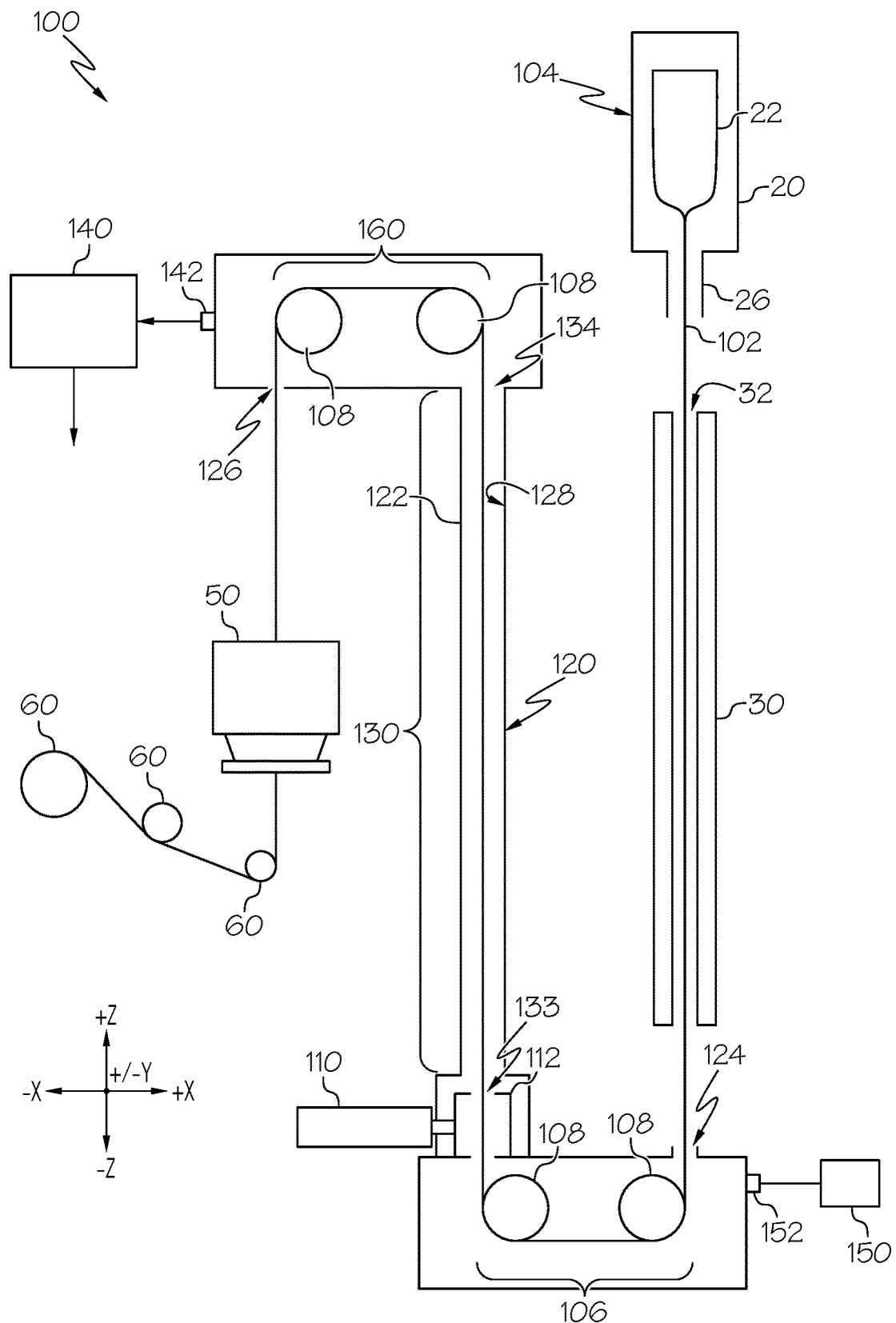
FIG. 2 schematically depicts a system for producing an optical fiber; according to one or more embodiments described herein.

Referring to FIG. 2, an example of a system 100 for processing optical fibers according to the present disclosure is schematically depicted. As shown in the example in FIG. 2, the system 100 may include a furnace 20 having a fiber preform 22 operable to produce an optical fiber 102, at least one positioner (e.g., first positioner 106) downstream of the furnace 20, a reheating device 110 downstream of the first positioner 106, and a treatment device 120 that may include a treatment zone 130 downstream of the reheating device 110. The positioner may be operable to reduce variability in the process pathway of the optical fiber 102. The treatment device 120 may be operable to cool the optical fiber 102 in the treatment zone 130 under vacuum at a cooling rate less than a cooling rate of the optical fiber 102 in air at 25° C. and 1 atm. Processing the optical fiber 102 may include drawing the optical fiber 102 from a furnace 20, reheating the optical fiber 102, and cooling the optical fiber under vacuum at a cooling rate less than the cooling rate of the optical fiber in air at 25° C. and 1 atm. Cooling the optical fiber 102 under vacuum may be conducted after reheating the optical fiber.

Cooling the optical fiber 102 under vacuum (i.e., low operating pressure of less than atmospheric pressure) after reheating the optical fiber 102, according to the systems and methods described herein, may provide slow cooling of the optical fiber 102 for an extended period of time, which may reduce the fictive temperature of the optical fiber 102, thereby reducing signal attenuation in the optical fiber 102. The present description provides an optical fiber having a low fictive temperature. The optical fiber may be a glass fiber and may be processed under conditions that promote more structural relaxation of the fiber and reduction in attenuation in the optical fiber. The increased structural relaxation and/or closer approach of the optical fiber to an equilibrium state leads to a lower fictive temperature for the optical fiber and reduces the attenuation of the optical fiber. The systems and methods disclosed herein may enable formation of an optical fiber having ultra-low signal attenuation. Additionally, these systems and methods may enable increases in fiber draw speed compared to other fiber processing systems and methods.

For purposes of the present description, the illustrative embodiments relate to silica-based optical fibers. Silica-based optical fibers include fibers made from pure silica, doped silica, or a combination of pure and doped silica. Processing conditions (e.g. temperatures, fiber temperatures, operating pressures, heat transfer rates, residence times, draw speeds, etc.) and properties (e.g. fictive temperature, Rayleigh scattering, attenuation, etc.) are stated in reference to silica-based optical fibers. Although described in relation to silica-based optical fibers, it is understood that the principles of the present disclosure may be extended to optical fibers based on other material systems with due consideration for characteristics of the constituents of other material systems (e.g. melting temperature, viscosity, fictive temperature, time scale for structural relaxation etc.).

In conventional optical fiber processing, the optical fiber is formed by heating a glass preform to a temperature greater than the softening point of the glass and drawing the glass of the preform at large draw down ratios to form optical fibers with a desired diameter. For silica-based glass fibers, the glass preform can have diameters of from 100 millimeters (mm) to 120 mm or larger. The optical fibers drawn from these glass preforms may have a diameter of about 125 micrometers (μm). To manufacture silica glass fibers, the silica glass preform may be heated to a temperature greater than or equal to 2000° C. The optical fiber may be drawn from the glass preform at speeds of 10 meters per second (m/s) or greater. Due to the high draw temperatures, large draw down ratios, and fast draw speeds, the glass structure of the silica-based optical fibers is far from equilibrium and has a high fictive temperature of greater than 1500° C.

Figure 5:
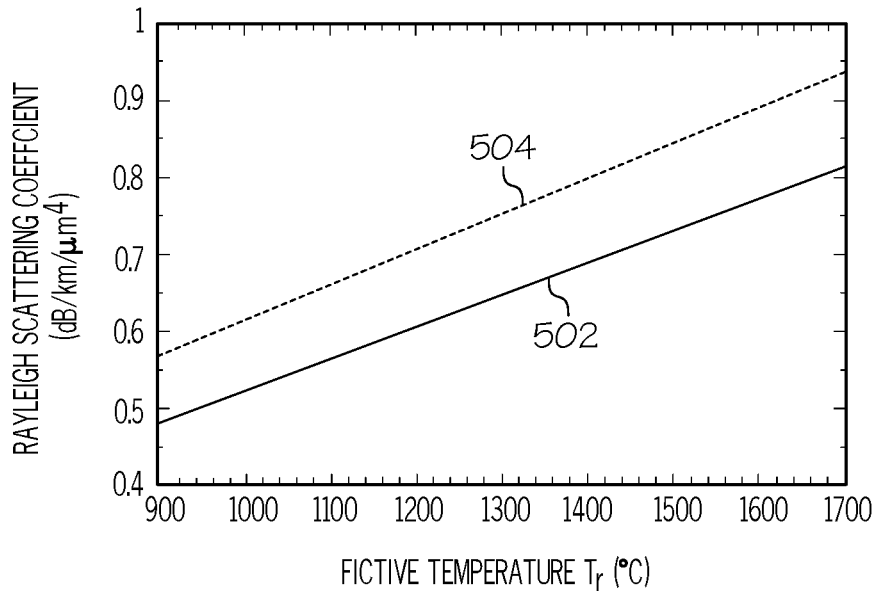
FIG. 5 graphically depicts the Rayleigh scattering coefficient (y-axis) of two glass compositions as functions of the fictive temperature (x-axis) of the glass compositions, according to one or more embodiments described herein.

Signal attenuation (i.e., loss in optical fibers) is an important attribute in determining the optical fiber quality. Without intending to be bound by theory, it is believed that the non-equilibrium structure of silica-based glass fibers is a significant underlying cause of signal attenuation in silica-based glass fibers. Rayleigh scattering refers to the scattering of light by defects or inhomogeneities in structure or composition in a material without a corresponding change in the wavelength of the light. With optical fibers, Rayleigh scattering refers to the scattering of the light signal by the glass. Rayleigh scattering contributes to the majority of signal attenuation in optical fibers. Referring to FIG. 5, Rayleigh scattering in optical fibers is proportional to the fictive temperature of the glass. FIG. 5 illustrates the relationship between the Rayleigh scattering coefficient and fictive temperature for a silica composition 502 and a germanium oxide-silica composition 504. As shown in FIG. 5, the Rayleigh scattering increases generally linearly with increasing fictive temperature. The relationship between Rayleigh scattering coefficient and fictive temperature can be described by the following Equation 1 (EQU. 1):

$$R_\rho = 8/3\pi^3 n^8 p^2 k_B \beta T_f \qquad \text{EQU. 1}$$

Where $R_\rho$ is the Rayleigh scattering coefficient, n is the refractive index of the glass, p is the average photo-elastic coefficient of the glass, $T_f$ is the fictive temperature, $k_B$ is the Boltzmann constant, and $\beta_T$ is the isothermal compressibility of the glass at a given fictive temperature. As shown by EQU. 1, the refractive index n of the glass and the fictive temperature $T_f$ may have a strong impact on Rayleigh scattering. EQU. 1 also shows that Rayleigh scattering $R_\rho$ is directly proportional to the fictive temperature $T_f$. Accordingly, it is believed that reducing the fictive temperature of the glass of the optical fiber may reduce Rayleigh scattering in the optical fiber, thereby reducing attenuation by the optical fiber.

For purposes of the present disclosure, fictive temperature will be used as an indicator of glass structure. Glasses with greater fictive temperatures have structures that are further removed from equilibrium than glasses with lesser fictive temperatures. Thus, processing conditions that reduce the fictive temperature of the glass may produce optical fibers with reduced Rayleigh scattering and reduced attenuation compared to optical fibers having a greater fictive temperature.

In some prior art optical fiber forming processes, the optical fibers are drawn in air at ambient pressure and ambient temperature. Cooling rates of the optical fiber in air may be greater than or equal to 12,000° C./second during draw processes based on these prior art methods. At these cooling rates, the residence time of the optical fiber at temperatures within the temperature range that facilitates reduction of the fictive temperature of the optical fiber is short (e.g., less than 0.05 sec), and the optical fiber is subsequently and quickly cooled to temperatures that kinetically quench the structure or state of the optical fiber. The fictive temperatures of the resulting optical fibers are accordingly high. In the case of silica-based optical fibers, for example, the fiber fictive temperatures of these optical fibers may be 1550° C. or greater. Such optical fibers with fictive temperatures of 1550° C. or greater may exhibit high Rayleigh scattering and high signal attenuation.

The fictive temperature of the glass of the optical fiber may be reduced by maintaining the optical fiber in the glass transition region or the near-glass transition region during cooling, which may facilitate relaxation of the structure of the optical fiber to reduce the fictive temperature of the optical fiber. As used herein, "glass transition region" (Tg region) is a temperature range that includes the glass transition temperature (Tg). For example, in some embodiments, the glass transition region extends from a temperature less than the glass transition temperature to a temperature above the glass transition temperature. For silica-based glass optical fibers, the glass transition region may be from 1200 degrees Celsius (° C.) to 1700° C. Additional relaxation of the glass or inducement of the glass toward a more nearly equilibrium state may occur below the glass transition region (i.e., a near-Tg region), which, for silica-based optical fibers, may correspond to temperatures between 1000° C. and 1200° C. This temperature region below the Tg region may be referred to herein as the near-Tg region. In some embodiments, a temperature of the optical fiber may be maintained within a temperature window of from 1000° C. to 1700° C. during cooling. For example, in some embodiments, the temperature of the optical fiber may be maintained in the temperature window of from 1000° C. to 1600° C., from 1000° C. to 1500° C., from 1200° C. to 1700° C., from 1200° C. to 1600° C., from 1200° C. to 1500° C., from 1300° C. to 1700° C., from 1300° C. to 1600° C., or even from 1300° C. to 1500° C.

When the optical fiber is cooled to fiber temperatures less than the near-Tg region (i.e., at temperatures less than 1000° C.), the structure of the glass and/or state of the optical fiber is kinetically quenched and invariant (on practical time scales) because the available thermal energy is less than the energy required to relax or otherwise modify the glass to effect structural relaxation or a closer approach to an equilibrium state. As used herein, "fiber temperature" refers to the temperature of the fiber during the processing. As used herein, "process temperature" refers to the temperature to which the fiber is exposed during processing. The process temperature or process temperature window, for example, may correspond to a temperature or temperature window maintained in the treatment device described herein. It is understood that the fiber temperature may differ from the process temperature.

In some processes for producing optical fibers, a slow cooling device (SCUD) may be used to cool the optical fiber at a reduced cooling rate after the optical fiber is drawn in a furnace. Referring now to FIG. 1, a typical system 10 for producing an optical fiber is schematically depicted. System 10 includes a fiber preform 22 disposed in a furnace 20. Fiber preform 22 may be constructed of a glass, such as silica glass, and may include regions of different composition. Fiber preform 22, for example, may include regions of modified and unmodified silica glass with compositions corresponding to the core and cladding compositions desired for optical fibers drawn from the fiber preform 22. The fiber preform 22 is heated in furnace 20, and the optical fiber 12 is drawn therefrom. The optical fiber 12 may pass through a slow cooling device (SCUD) 30 downstream of the furnace 20. In the SCUD 30, the optical fiber 12 may begin to cool. The optical fiber 12 exits the SCUD 30 and is directed through a cooling region that includes a series of fluid bearing devices 40. The fluid bearing devices 40 further cool the optical fiber 12 and direct the optical fiber 12 to a coating unit 50, at which a coating is applied to provide a coated optical fiber 52. After being passed out of the coating unit 50, the coated optical fiber 52 may go through a variety of other processing stages within the system 10 that are known in the art (not shown). Drawing mechanisms 60 may be used to provide tension on the optical fiber 12 as it is drawn through the system 10.

In the system 10 of FIG. 1, the SCUD 30 may be positioned immediately downstream of the furnace 20 so that the optical fiber 12 drawn from the fiber preform 22 can be immediately introduced to slow cooling to reduce the cooling rate of the optical fiber 12 and maintain the temperature of the optical fiber 12 in the Tg or near-Tg region for a longer period of time. Maintaining the temperature of the optical fiber 12 in the Tg or near Tg region for a longer period of time using the SCUD 30 may reduce the fictive temperature of the optical fiber 12, which may reduce the Rayleigh scattering loss and reduce the attenuation of the optical fiber 12.

At lesser fiber draw speeds, such as draw speeds less than 30 meters per second, the optical fiber 12 can be slow-cooled in a standard SCUD 30 sufficiently to decrease the fictive temperature of the optical fiber 12. However, to meet ever-increasing market demand for optical fiber and reduce fiber manufacturing cost, there is a need to increase the fiber draw speeds of the optical fiber 12 to draw speeds of 30 m/s or greater, or 40 m/s or greater, or 50 m/s or greater, or even greater than 60 m/s, including, for example, draw speeds in the range from 30 m/s to 100 m/s, or 40 m/s to 90 m/s, or 50 m/s to 80 m/s. As the fiber draw speed is increased, the residence time of the optical fiber 12 inside the SCUD 30 is reduced. In some embodiments, the residence time of the optical fiber 12 in the SCUD 30 may be 0.1 seconds or less. It has been found that residence times of the optical fiber 12 inside the SCUD 30 of less than 0.1 seconds are not sufficient to slow cool the optical fiber 12 at temperatures in the Tg or near Tg regions for long enough to appreciably reduce the fictive temperature of the glass. At the increased draw speeds, the residence time can be increased by increasing the length of the SCUD 30. However, current facilities have reached their physical limits with respect to height and length of the SCUD 30. One approach to increasing the residence time would be to build higher draw towers in order to lengthen the SCUD 30 to increase the residence time of the optical fiber 12 in the SCUD 30. However, this approach is capital intensive and further increases in draw speed remain limited by the height of the draw tower.

In addition to reducing the residence time in the SCUD 30, increased draw speeds of 50 m/s or greater may cause gas flow in the SCUD 30 to become unstable, since the flow Reynolds number increases with fiber draw speed. The instability in the flow regime at the greater draw speeds of 50 m/s or greater results in a steep increase in the heat transfer coefficient, which increases the heat transfer rate in the SCUD 30. Thus, as the draw speed increases, the ability of a standard SCUD to maintain the optical fiber 12 within the Tg or near-Tg regions may be reduced and the standard SCUD may not be capable of slow cooling the fiber.

The present disclosure is directed to systems and methods of processing optical fibers that include positioning the optical fiber, reheating the optical fiber, and cooling the optical fiber under vacuum after reheating the optical fiber. Cooling the optical fiber under vacuum (i.e., reduced pressure) may reduce the rate of heat transfer away from the optical fiber by decreasing the convective heat transfer coefficient. Reducing the heat transfer away from the optical fiber may maintain the fiber temperature of the optical fiber within the Tg or near-Tg regions during slow cooling. As used herein, the term "vacuum" refers to a reduced operating pressure that is less than atmospheric pressure. In contrast to the prior art, the present disclosure describes systems and methods for drawing optical fibers in which the optical fibers are maintained at fiber temperatures between 1000° C. and 1700° C. for longer than 0.1 second (sec), or longer than 0.2 sec, or longer than 0.3 sec, or longer than 0.4 sec, or longer than 0.5 sec, or longer than 1.0 sec, or longer than 2.0 sec, or longer than 3.0 sec, or longer than 4.0 sec. As will be described subsequently in this disclosure, the rate of heat transfer away from the optical fiber may be further reduced by increasing the resistance to conductive heat transfer through increasing the inner diameter of the treatment device and/or introducing a working gas having a thermal conductivity less than the thermal conductivity of air. In other words, the rate of heat transfer away from the optical fiber may be reduced by reducing the conductive heat transfer coefficient.

Additionally, the systems and methods disclosed herein can be retrofitted to existing fiber draw towers. Thus, the systems and methods disclosed herein may increase the amount of time the optical fiber is subjected to slow cooling and maintained at a fiber temperature of from 1000° C. to 1700° C. without having to increase the height of the draw tower. Further, the use of vacuum technology to reduce the rate of heat transfer may allow for increases in fiber draw speed without substantially increasing the flow turbulence of gases contacting the optical fiber.

Referring again to FIG. 2, the system 100 for producing an optical fiber 102 may include a heated glass source 104, a first positioner 106, a reheating device 110, and a treatment device 120. In some embodiments, the system 100 may also include a standard SCUD 30, at least one second positioner 160, the coating unit 50, the drawing mechanism 60, other downstream process, or combinations of these. The systems 100 and methods disclosed herein reduce the rate of heat transfer away from the optical fiber 102 when the optical fiber 102 is passing through the treatment device 120.

The heated glass source 104 may include a fiber preform 22 disposed within a furnace 20. The fiber preform 22 may be constructed of a glass, such as silica-based glass, and may include regions of different composition. For example, in some embodiments, the fiber preform 22 may include regions of modified and unmodified silica glass with compositions corresponding to core and cladding glass compositions desired for the optical fiber 12 drawn from the fiber preform 22. The furnace 20 may be maintained at a furnace temperature greater than the softening temperature of the glass of the fiber preform 22. For example, in some embodiments, the furnace 20 may be operable to maintain the fiber preform 22 at a temperature of greater than or equal to 2000° C.

The fiber preform 22 may move relative to the furnace 20, which is generally maintained in a fixed position. For example, the fiber preform 22 may change positions horizontally (i.e., the X-Y plane of the coordinate axis of FIG. 2) and/or vertically (i.e., in the +/−Z direction of the coordinate axis of FIG. 2) relative to the furnace 20. In some embodiments, the fiber preform 22 may translate horizontally relative to the furnace 20 during drawing of the optical fiber 102 from the fiber preform 22. Horizontal translation of the fiber preform 22 relative to the furnace 20 may cause the process pathway of the optical fiber 102 to vary its position in the X-Y plane of the coordinate axis of FIG. 2.

Referring to FIG. 2, the first positioner 106 may be positioned downstream of the heated glass source 104 (i.e., farther away from the furnace 20 along the process pathway). In some embodiments, the first positioner 106 may be operable to reduce variability in the process pathway of the optical fiber 102 caused by horizontal movement of the fiber preform 22 relative to the furnace 20 during the drawing process. For example, in some embodiments, the first positioner 106 may be operable to establish a consistent process pathway of the optical fiber 102 downstream of the first positioner 106. The first positioner 106 may be operable to reduce variability in the position and/or process pathway of the optical fiber caused by movement of the fiber preform 22 relative to the furnace 20. In some embodiments, the first positioner 106 may be operable to maintain the optical fiber 102 in a consistent position relative to the reheating device 110 and treatment device 120 downstream of the first positioner 106. In some embodiments, the first positioner 106 may additionally be operable to change a direction of the process pathway of the optical fiber 102. For example, in some embodiments, the first positioner 106 may be operable to change the direction of the process pathway of the optical fiber 102 from a generally downward direction (i.e., in the −Z direction of the coordinate axis of FIG. 2) to a generally upward direction (i.e., in the +Z direction of the coordinate axis of FIG. 2). It is understood that the first positioner 106 may be operable to change the direction of the process pathway of the optical fiber 102 in any direction relative to the initial path of the optical fiber 102 from the fiber preform 22 to the first positioner 106. The change in the direction of the process pathway is greater than 5°, or greater than 10°, or greater than 30°, or greater than 50°, or greater than 70°. A change in the direction of the process pathway from vertical to horizontal, for example, corresponds to a 90° change in the direction of the process pathway of the optical fiber.

In some embodiments, the first positioner 106 may include one or more than one fluid bearing device 108, as shown in FIG. 2. Examples of fluid bearing devices 108 are described in U.S. Pat. No. 7,937,971, the disclosure of which is incorporated by reference herein. It should be understood, however, that other designs are possible for the fluid bearing devices 108 and that the benefits achievable by the methods and apparatus disclosed herein are not limited to a particular design for the fluid bearing devices 108. It is also understood that the first positioner 106 may include types of optical fiber positioners other than fluid bearing devices 108.

Referring to FIG. 2, the reheating device 110 may be positioned downstream of the first positioner 106. The reheating device 110 may be operable to reheat the optical fiber 102 downstream of the first positioner 106. The reheating device 110 may be operable to reheat the optical fiber 102 to a temperature in the Tg or near-Tg regions of the optical fiber 102. For example, in some embodiments, the reheating device 110 may be operable to reheat the optical fiber 102 to a temperature of from 1000° C. to 1700° C. For example, in some embodiments, the reheating device 110 may be operable to reheat the optical fiber 102 to a temperature of from 1000° C. to 1600° C., from 1000° C. to 1500° C., from 1200° C. to 1700° C., from 1200° C. to 1600° C., from 1200° C. to 1500° C., from 1300° C. to 1700° C., from 1300° C. to 1600° C., or even from 1300° C. to 1500° C.

Figure 3:
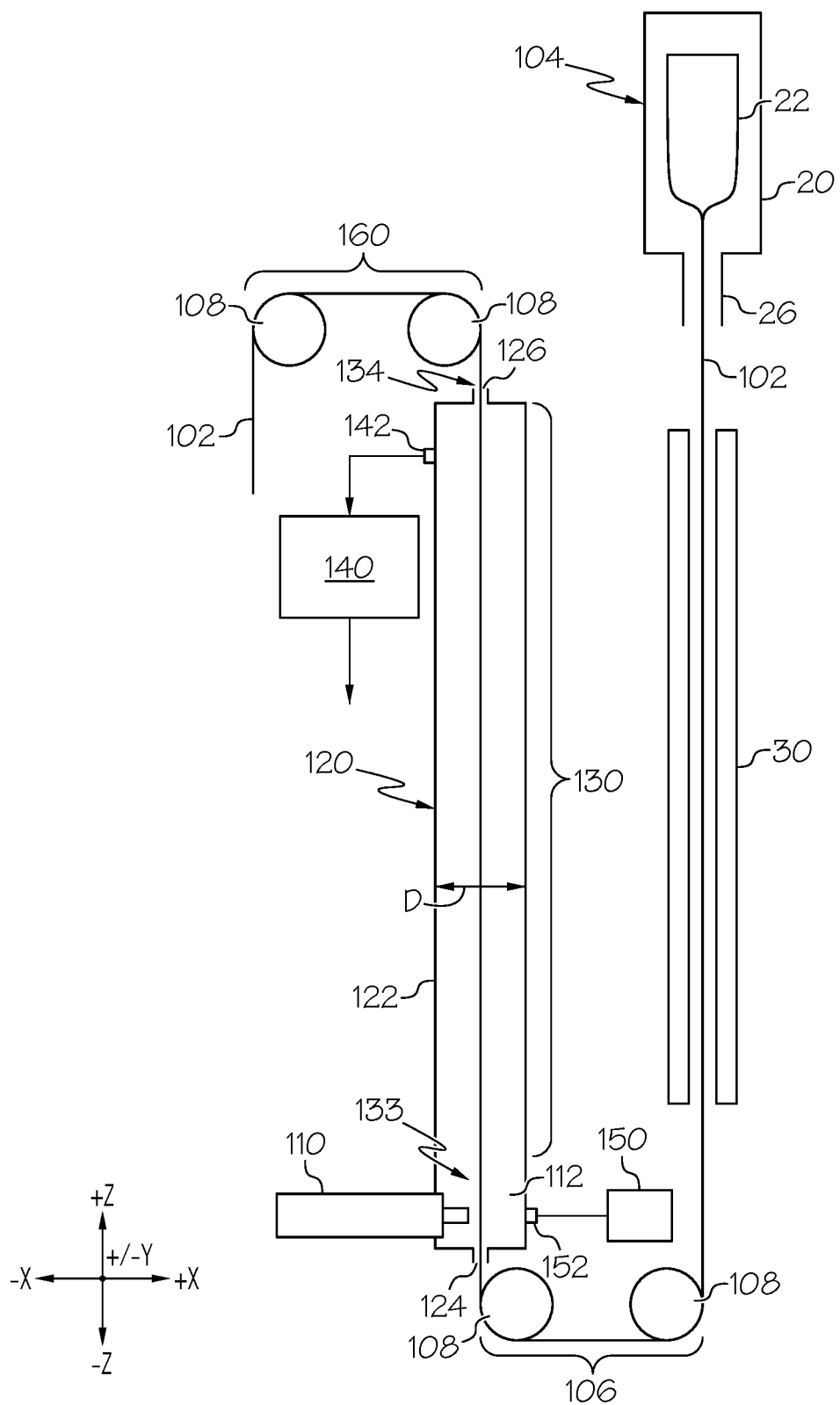
FIG. 3 schematically depicts another system for producing an optical fiber; according to one or more embodiments described herein.

The reheating device 110 may be any suitable type of reheating device capable of reheating the optical fiber 102 in a short period of time. In some embodiments, the reheating device 110 may include at least one of a laser heating device, flame heating device, radiant heating device, other type of heating device, or combinations of these. Referring to FIG. 3, in some embodiments, the reheating device 110 may be a laser heating device.

Referring again to FIG. 2, the treatment device 120 may include a chamber 122 having a fiber inlet 124 and a fiber outlet 126. The chamber 122 of the treatment device 120 may define a treatment zone 130 downstream of the reheating device 110. The treatment zone 130 may be disposed between the fiber inlet 124 and fiber outlet 126 and downstream of the reheating device 110. For example, in some embodiments, an entrance 133 to the treatment zone 130 may be downstream of the reheating device 110 and an exit 134 of the treatment zone 130 may be upstream of the fiber outlet 126. The optical fiber 102 may pass through the treatment zone 130 of the treatment device 120 after passing through the reheating device 110. In some embodiments, the chamber 122 may be generally cylindrical in the treatment zone 130. The chamber 122 may have an inner diameter D in the treatment zone 130 that may be sufficient to increase the resistance to heat conduction, thereby reducing the heat transfer away from the optical fiber 102 and decreasing the cooling rate of the optical fiber 102. For example, in some embodiments, the chamber 122 may have an inner diameter D in the treatment zone 130 of greater than or equal to 4 centimeters (cm), greater than or equal to 5 cm, or even greater than or equal to 6 cm. In some embodiments the chamber 122 may have an inner diameter D in the treatment zone 130 of from 4 cm to 40 cm, from 4 cm to 30 cm, from 4 cm to 20 cm, from 5 cm to 40 cm, from 5 cm to 30 cm, from 5 cm to 20 cm, from 6 cm to 40 cm, from 6 cm to 30 cm, or even from 6 cm to 20 cm.

Referring to FIG. 2, the chamber 122 may be fluidly coupled to a vacuum system 140. For example, in some embodiments, the chamber 122 may include a vacuum port 142 fluidly coupled to the vacuum system 140. The vacuum system 140 may be capable of producing a reduced pressure within the chamber 122. For example, the vacuum system 140 may include a vacuum pump, Venturi device, or other device capable of producing a reduced pressure within the chamber 122, or combinations of these. The vacuum system 140 may be operable to produce a pressure within the chamber 122 of less than 1 atmosphere (atm) (101.3 kilopascals (kPa), where 1 atm=101.3 kPa), such as less than or equal to 0.8 atm (81.1 kPa), less than or equal to 0.5 atm (50.7 kPa), less than or equal to 0.3 atm (30.4 kPa), or even less than or equal to 0.1 atm 10.1 kPa). For example, in some embodiments, the vacuum system 140 may be operable to produce a pressure within the chamber 122 of from 0.005 atm (0.507 kPa) to 1.0 atm, from 0.005 atm to 0.8 atm, from 0.005 atm to 0.5 atm, from 0.005 atm to 0.3 atm, from 0.005 atm to 0.1 atm, from 0.01 atm (1.01 kPa) to 1.0 atm, from 0.01 atm to 0.8 atm, from 0.01 atm to 0.5 atm, from 0.01 atm to 0.3 atm, from 0.01 atm to 0.1 atm, from 0.05 atm (5.07 kPa) to 1.0 atm, from 0.05 atm to 0.8 atm, from 0.05 atm to 0.5 atm, from 0.05 atm to 0.3 atm, or from 0.05 atm to 0.1 atm.

Referring still to FIG. 2, in some embodiments, the vacuum port 142 may be positioned in a downstream portion of the treatment device 120 proximate the fiber outlet 126.

Positioning the vacuum port 142 proximate the fiber outlet 126 may cause gases and/or vapors within the treatment device 120 to flow co-current with the optical fiber 102 as the optical fiber 102 passes through the treatment zone 130 of the treatment device 120. Co-current gas flow within the treatment zone 130 of the treatment device 120 may reduce the turbulence of flow, thereby reducing the rate of convective heat transfer within the treatment zone 130 compared to a countercurrent flow of gas.

In some embodiments, the chamber 122 of the treatment device 120 may be fluidly coupled to a working gas source 150 for providing a working gas other than air to the chamber 122 of the treatment device 120. For example, in some embodiments, the chamber 122 of the treatment device 120 may include a working gas port 152, which may be fluidly coupled to the working gas source 150. The working gas source 150 may provide a working gas to the internal volume of the chamber 122 of the treatment device 120 during operation of the system 100. In some embodiments, the working gas may be an inert gas that does not react with the glass of the optical fiber 102 at the glass temperature and/or process temperature in the treatment device 120. Examples of inert gases may include, but are not limited to helium, neon, argon, xenon, nitrogen, krypton, other inert gas, or combinations of these. In some embodiments, the working gas may be a gas having a thermal conductivity less than the thermal conductivity of air so that the presence of the working gas with the reduced thermal conductivity may further reduce the rate of heat conduction away from the optical fiber 102 in the treatment device 120 compared to the rate of heat conduction in air. Examples of working gases having thermal conductivities less than air may include, but are not limited to, argon, xenon, krypton, other noble gas with a molecular weight greater than argon, or combinations of these. In some embodiments, the working gas may be argon.

In some embodiments, the working gas port 152 may be positioned in an upstream portion of the chamber 122 proximate the fiber inlet 124. Positioning the working gas port 152 proximate the fiber inlet 124 may enable the working gas supplied by the working gas source 150 to travel in co-current flow relative to the optical fiber 102 passing through the treatment device 120. As previously discussed, co-current flow of the working gas relative to the optical fiber 102 may reduce the rate of convective heat transfer from the optical fiber 102 compared to a countercurrent flow configuration.

In some embodiments, the treatment device 120 may include a heating element (not shown) operable to heat an internal surface 128 of the chamber 122. In some embodiments, the internal surface 128 of the chamber 122 may be heated to a surface temperature sufficient to reduce a temperature gradient between the optical fiber 102 and the chamber 122 of the treatment device 120. Reducing the temperature gradient between the optical fiber 102 and the chamber 122 of the treatment device 120 may further reduce the rate of heat transfer from the optical fiber 102 towards the chamber 122 of the treatment device 120. In some embodiments, the internal surface 128 of the chamber 122 in the treatment zone 130 may be heated to a surface temperature greater than or equal to 100° C., such as greater than or equal to 300° C., or even greater than or equal to 500° C. In some embodiments, the internal surface 128 of the chamber 122 in the treatment zone 130 may be heated to a surface temperature of from 100° C. to 1700° C., from 100° C. to 1200° C., from 100° C. to 1000° C., from 300° C. to 1700° C., from 300° C. to 1200° C., from 300° C. to 1000° C., from 500° C. to 1700° C., from 500° C. to 1200° C., or from 500° C. to 1000° C. In some embodiments, the internal surface 128 of the chamber 122 in the treatment zone 130 may be heated to a surface temperature of less than or equal to 1000° C., or even less than or equal to 800° C.

Referring to FIG. 2, in some embodiments, the chamber 122 of the treatment device 120 may include a reheating zone 112 upstream of the treatment zone 130. The reheating zone 112 may enclose the optical fiber 102 proximate the reheating device 110 so that reheating of the optical fiber 102 may be conducted at reduced pressure (i.e., under vacuum). The reheating zone 112 may be fluidly coupled to the treatment zone 130 so that reheating of the optical fiber 102 may be conducted at the same reduced pressure as the treatment zone 130. The reheating device 110 may be disposed within the reheating zone 112 of the treatment device 120. Alternatively or additionally, the reheating device 110 may be coupled to the chamber 122 at the reheating zone 112. For example, in some embodiments, the reheating device 110 may be a laser heating device that is optically coupled to the chamber 122 at the reheating zone 112 so that the laser heating device may reheat the optical fiber 102 passing through the reheating zone 112. In these embodiments, the hardware for the reheating device 110 may be physically positioned outside of the chamber 122 while still being capable of reheating the optical fiber 102 passing through the reheating zone 112 of the chamber 122. For example, in some embodiments, the chamber 122 may include a quartz window in the reheating zone 112. The quartz window may be operable to allow the laser from the reheating device 110 to pass through and into the reheating zone 112 of the chamber 122 to reheat the optical fiber 102. It is understood that other configurations for the reheating zone 112 and reheating device 110 may also be effective at reheating the optical fiber 102 at reduced pressure.

As shown in FIG. 2, the chamber 122 may also enclose the first positioner 106. For example, in some embodiments, the chamber 122 may enclose the optical fiber 102 from a position upstream of the first positioner 106 to a position downstream of the treatment zone 130. The chamber 122 may enclose the reheating zone 112 and the first positioner 106. In these embodiments, the fiber inlet 124 to the treatment device 120 may be upstream of the first positioner 106 (e.g., positioned between the SCUD 30 and the first positioner 106). Enclosing the reheating zone 112 and first positioner 106 within the chamber 122 of the treatment device 120 may enable the positioning and reheating of the optical fiber 102 to be conducted under vacuum (e.g., at reduced pressure relative to ambient pressure). As shown in FIG. 2, in some embodiments, the chamber 122 of the treatment device 120 may enclose a second positioner 160 disposed downstream of the treatment zone 130. In these embodiments, the fiber outlet 126 may be disposed downstream of the second positioner 160.

Referring now to FIG. 3, in some embodiments, the chamber 122 of the treatment device 120 may enclose the reheating zone 112, but not the first positioner 106. In these embodiments, the reheating of the optical fiber 102 may be conducted under reduced pressure after positioning the optical fiber 102 with the first positioner 106 at ambient conditions. In some embodiments, the fiber inlet 124 of the treatment device 120 may be positioned upstream of the reheating zone 112 and downstream of the first positioner 106. In some embodiments, the optical fiber 102 may be positioned by the first positioner 106 in air before being introduced to the chamber 122 of the treatment device 120 through fiber inlet 124.

Figure 4:
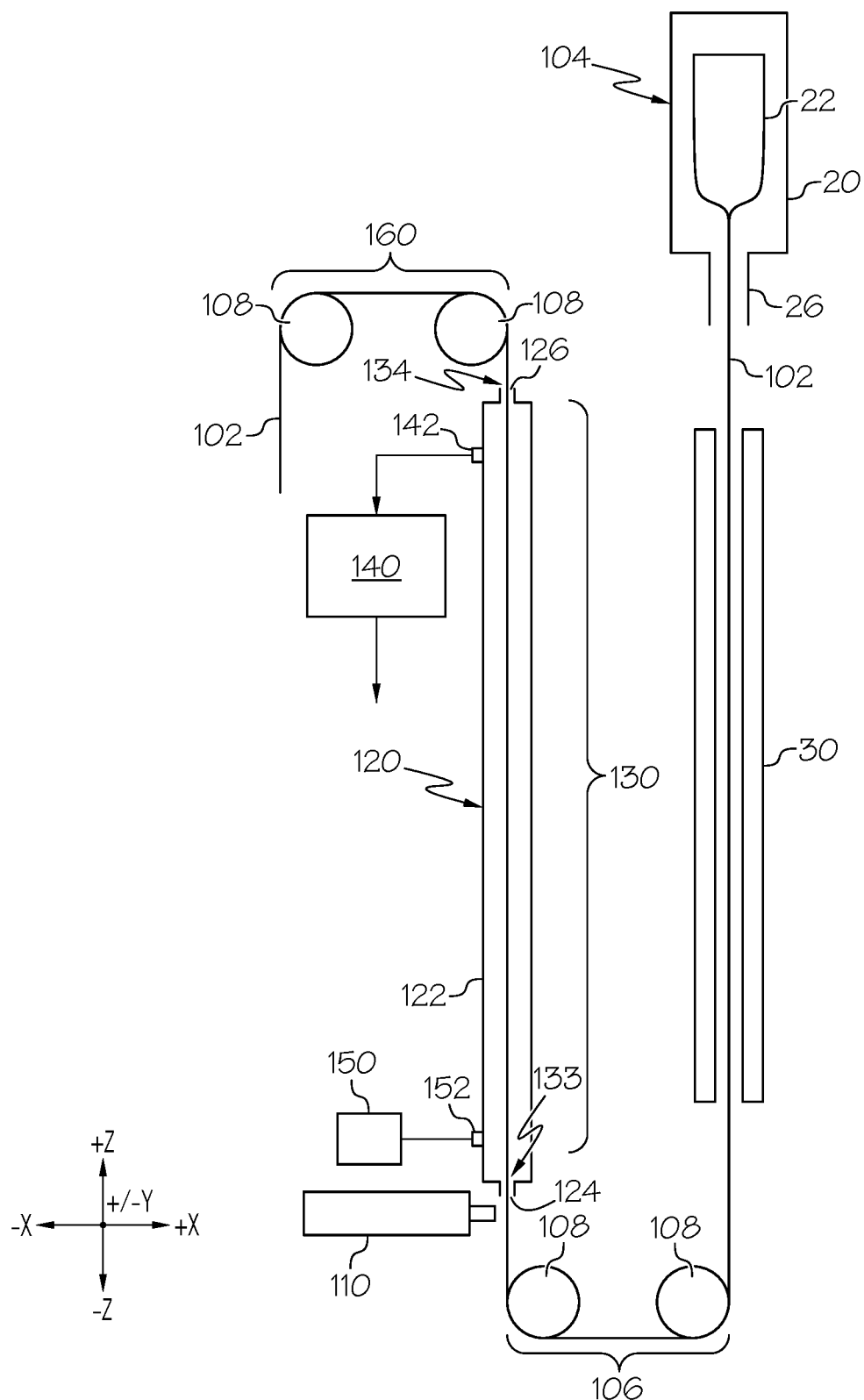
FIG. 4 schematically depicts yet another system for producing an optical fiber; according to one or more embodiments described herein.

Referring now to FIG. 4, in some embodiments, the chamber 122 of the treatment device 120 may be disposed downstream of the first positioner 106 and the reheating device 110. Thus, in some embodiments, the optical fiber 102 may be positioned by the first positioner 106 and reheated by the reheating device 110 before entering the chamber 122 of the treatment device 120 through the fiber inlet 124.

Referring to FIGS. 2-4, as previously discussed herein, the system 100 for producing optical fibers 102 may include the SCUD 30 positioned between the furnace 20 and the first positioner 106. The SCUD 30 may provide for initial slow cooling of the optical fiber 102 drawn from the fiber preform 22. In some embodiments, the SCUD 30 may be operated at atmospheric pressure (e.g., ambient pressure). The SCUD 30 may have an internal surface heated to a temperature within the Tg or near-Tg region of the optical fiber 102. In some embodiments, the SCUD 30 may have an internal surface temperature of greater than or equal to 1000° C., greater than or equal to 1200° C., greater than or equal to 1500° C. or even greater than or equal to 1700° C.

Referring again to FIG. 2, operation of the system 100 will now be described. As shown in FIG. 2, the fiber preform 22 is heated in the furnace 20 to a temperature above the softening temperature of the glass compositions of the fiber preform 22. The optical fiber 102 is drawn from the fiber preform 22 and passed out of the furnace 20 through the fiber outlet 26. The optical fiber 102 may be passed through the heated SCUD 30 immediately downstream of the furnace 20. In the heated SCUD 30, the optical fiber 102 may be slow cooled to maintain the temperature of the optical fiber 102 within the Tg or near-Tg region as the optical fiber 102 passes through the SCUD 30. However, as previously discussed, at high draw speeds of greater than 50 m/s, the residence time of the optical fiber 102 in the SCUD 30 may not be sufficient to allow for relaxation of the glass core to achieve a reduction in the fictive temperature of the optical fiber 102.

In some embodiments, the SCUD 30 may be placed under vacuum to slow cool the optical fiber 102 in the SCUD 30 under reduced pressure. However, slow cooling the optical fiber 102 under vacuum in the SCUD 30 may present operational challenges that reduce the efficiency of the system 100. In a typical drawing process, the fiber preform 22 may be decoupled from the furnace 20 so that the fiber preform 22 is capable of moving relative to the fixed position of the furnace 20. Movement of the fiber preform 22 relative to the furnace 20 causes the process pathway of the optical fiber 102 drawn from the fiber preform 22 to fluctuate in the horizontal plane (i.e., vary in the X/Y plane of the coordinate axis in FIG. 2). Because of the proximity of the SCUD 30 to the furnace 20, the inlet 32 of the SCUD 30 must be large enough to accommodate the variability in the horizontal position of the optical fiber 102. The increased size/diameter of the inlet 32 of the SCUD 30 may make it difficult to reduce the pressure within the SCUD 30. The pressure may be reduced by increasing the vacuum applied to the SCUD 30. However, increasing the vacuum applied to the SCUD 30 also may increase the velocity of air flow entering the SCUD 30 through the inlet 32. Increasing the velocity of the air at the inlet 32 may increase vibrations of the optical fiber 102, which can lead to breakage of the optical fiber 102 and downtime of the system 100. Therefore, slow cooling the optical fiber 102 under vacuum in the SCUD 30 may reduce the efficiency of the system 100. Thus, in some embodiments, the SCUD 30 may be operated at atmospheric pressure and may slow cool the optical fiber 102 by heating the internal surfaces of the SCUD 30 to reduce the temperature gradient between the optical fiber 102 and the SCUD 30. In some embodiments, the optical fiber 102 may be passed through the SCUD 30 at atmospheric pressure, where an internal surface of the SCUD 30 may be maintained at a temperature within the Tg or near-Tg region of the optical fiber 102.

Referring to FIG. 2, the optical fiber 102 may be passed out of the SCUD 30 through outlet 34. The optical fiber 102 may then be passed over the first positioner 106. The first positioner 106 may position the optical fiber 102 to reduce the variability in the process pathway of the optical fiber 102. Reducing the variability in the process pathway of the optical fiber 102 may enable the size of the fiber inlet 124 to the treatment device 120 to be reduced, which may make it easier to maintain reduced pressure in the chamber 122 of the treatment device 120. The first positioner 106 may enable the fiber inlet 124 to be reduced in size whether the fiber inlet 124 is positioned upstream or downstream of the first positioner 106. Reducing the size of the fiber inlet 124 to the treatment device 120 may also reduce the velocity of air flow into the fiber inlet 124, which may reduce vibrations of the optical fiber 102 and reduce breakage of the optical fiber 102.

Downstream of the first positioner 106, the optical fiber 102 may be passed by or through the reheating device 110. In some embodiments, the optical fiber 102 may pass through the reheating zone 112 defined by the chamber 122 of the treatment device 120. The reheating device 110 may reheat the optical fiber 102 to a temperature that is within the Tg or near-Tg region of the glass of the optical fiber 102.

Once reheated, the optical fiber 102 may be passed through the treatment zone 130 of the treatment device 120. In the treatment zone 130, the optical fiber 102 may be slow cooled under vacuum (i.e., reduced pressure) to reduce the fictive temperature of the glass of the optical fiber 102. Slow cooling the optical fiber 102 under reduced pressure may decrease the rate of heat transfer from the optical fiber 102 by reducing convective heat transfer away from the optical fiber 102. Not intending to be bound by theory, it is believed that reducing the pressure in the chamber 122 of the treatment device 120 reduces the number of molecules of gas that are available to contact the surface of the optical fiber 102 and transfer heat away from the optical fiber through convective heat transfer. Reducing the rate of heat transfer away from the optical fiber 102 may enable the treatment device 120 to maintain the optical fiber 102 in the Tg or near-Tg region of the optical fiber 102 for a longer period of time. For example, in some embodiments, reducing the rate of heat transfer away from the optical fiber 102 by slow cooling the optical fiber 102 under vacuum in the treatment device 120 may maintain the optical fiber 102 at a fiber temperature within the range of from 1000° C. to 1700° C. for a time period greater than 0.1 sec, greater than 0.2 sec, greater than 0.3 sec, greater than 0.4 sec, greater than 0.5 sec, greater than 1.0 sec, greater than 2.0 sec, greater than 3.0 sec, or even greater than 4.0 sec.

The effects of reducing the pressure on the heat transfer rate can be modeled by using a computational fluid dynamics model. The model can rely on the continuum approach in which the gaseous fluid flow is assumed to be a continuum rather than a collection of discrete particles. The continuum approach can be validated for modeling the gas flow in the treatment device 120 under reduced pressure by calculating the Knudsen number Kn from Equation 2 (EQU. 2).

$$Kn = \frac{\lambda}{L} \quad \text{EQU. 2}$$

In EQU. 2, $\lambda$ is the mean free path and L is the characteristic physical dimension (e.g., the inner diameter D of the chamber 122 in the treatment zone 130 of the treatment device 120). For a chamber 122 having an inner diameter D of 4 cm with air at an operating pressure of 1 mbar (1 millibar) (0.000987 atm or 0.100 kPa), the Knudsen number Kn was calculated to be 0.00246, which indicates that the characteristic length is substantially greater than the mean free path of the fluid. The Knudsen number Kn of 0.00246 is well below the critical value of 0.1, above which the continuum approach is not valid. Thus, use of a computational fluid dynamics model based on the continuum approach to simulate flow and heat transfer in the chamber 122 of the treatment device 120 having a diameter of 4 cm or more and operating pressures greater than 1 mbar was found to be valid.

Figure 6:
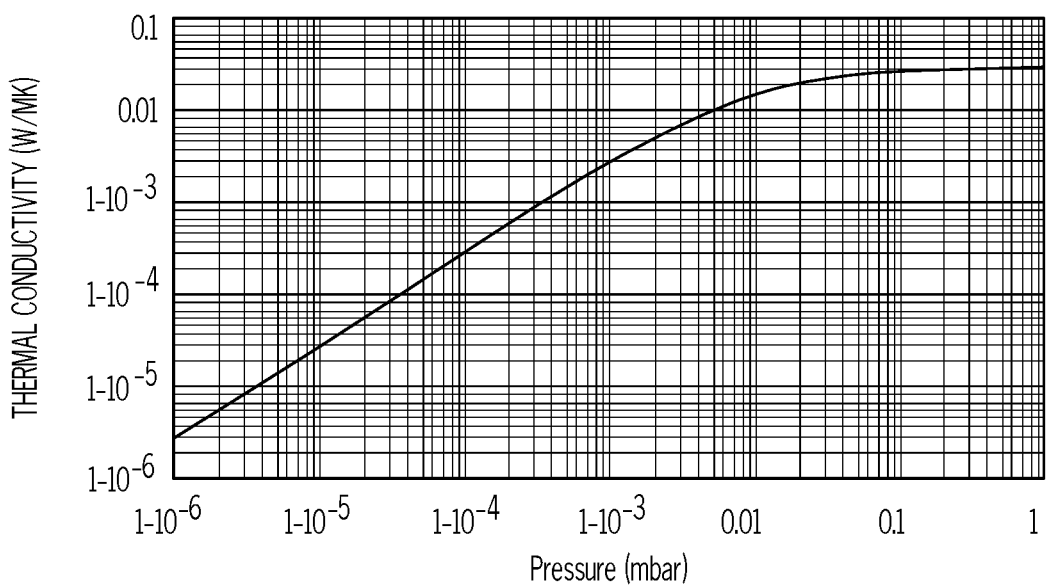
FIG. 6 graphically depicts the thermal conductivity of air (y-axis) as a function of operating pressure (x-axis), according to one or more embodiments described herein.

Referring to FIG. 6, the thermal conductivity of air as a function of operating pressure is depicted. As shown in FIG. 6, the thermal conductivity of air does not change with operating pressure unless the operating pressure is reduced below 1 mbar (0.1 kPa). For operating pressures above 1 mbar, the thermal conductivity of air doesn't depend on pressure. Thus, at operating pressures above 1 mbar, a change in the operating pressure is not expected to change the rate of heat conduction from the optical fiber 102.

At ambient pressure, heat transfer away from the optical fiber 102 is mainly driven by convection and radiation. The relative contributions to heat flow from convection, radiation and conduction are provided below in Equation 3 (EQU. 3).

$$Q = hA_f(T - T_\infty) + \varepsilon \sigma A_f(T^4 - T_\infty^4) + \frac{2\pi k L (T - T_\infty)}{\ln\left(\frac{R_{SCD}}{R_f}\right)} \quad \text{EQU. 3}$$

In EQU. 3, Q is the total heat flow and the term $hA_f(T-T_\infty)$ is the convection heat flow, where h is the convective heat transfer coefficient, $A_f$ is the surface area of the fiber, $(T-T_\infty)$ is the temperature differential between the optical fiber and the internal surface 128 of the treatment chamber 122. The term $\varepsilon \sigma A_f(T^4-T_\infty^4)$ in EQU. 3 is the radiation heat flow, where $\varepsilon$ is the emissivity of the optical fiber and $\sigma$ is the Stephan-Boltzmann constant. The last term in EQU. 3 is the conduction heat flow, in which k is the thermal conductivity of air, L is the fiber length, $R_{SCD}$ is the radius of the internal surface 128 of the chamber 122 of the treatment device 120, and $R_f$ is the radius of the fiber 102. As shown in EQU. 3, radiation heat transfer is independent of operating pressure. Therefore, in some embodiments, the systems and methods described in this disclosure may focus on reducing heat loss from the optical fiber through reduction of convective heat transfer. As shown in EQU. 3, the total heat flux may be decreased by reducing the temperature differential through increasing a temperature of the internal surface 128 of the treatment device 120 or by reducing the convective heat transfer coefficient. The convective heat transfer coefficient depends on the physical properties of the fluid and the physical characteristics of the treatment device 120. Physical characteristics of the treatment device 120 may include, but are not limited to, the relative velocity between the optical fiber 102 and the fluid, the orientation of flow of the fluid relative to the optical fiber 102 (e.g., co-current, countercurrent, crosscurrent, etc.), the geometric shape of the treatment device 120, surface condition of the optical fiber 102, and the viscosity of the fluid in the treatment device 120.

The convective heat transfer coefficient for a thin cylinder (e.g., optical fiber 102) moving axially through a hollow cylinder containing air under ambient conditions can be modeled by Equation 4 (EQU. 4), which was published by Kase-Matsuo (S. Kase, and T. Matsuo, "Theoretical Analysis of Melt Spinning," J. Text. Mach. Soc. Japan, Vol. 18, No. 3, p. 188, (1965)).

$$h = \frac{0.42 k_a}{D} Re^{0.334} \quad \text{EQU. 4}$$

In EQU. 4, $k_a$ is the thermal conductivity of air, D is the inner diameter of the hollow cylinder, (e.g., the inner diameter of the treatment device 120 in the treatment zone 130), and Re is the Reynolds number of the fluid flow. Since FIG. 6 shows that the thermal conductivity of air does not depend on pressure for operating pressures greater than 1 mbar, the heat transfer coefficient can be reduced by reducing the Reynolds number through reducing the operating pressure of the treatment device 120. Reducing the operating pressure in the treatment device 120 may reduce the gas density, which in turn reduces the Reynolds number of the fluid flow in the treatment device 120.

Figure 7:
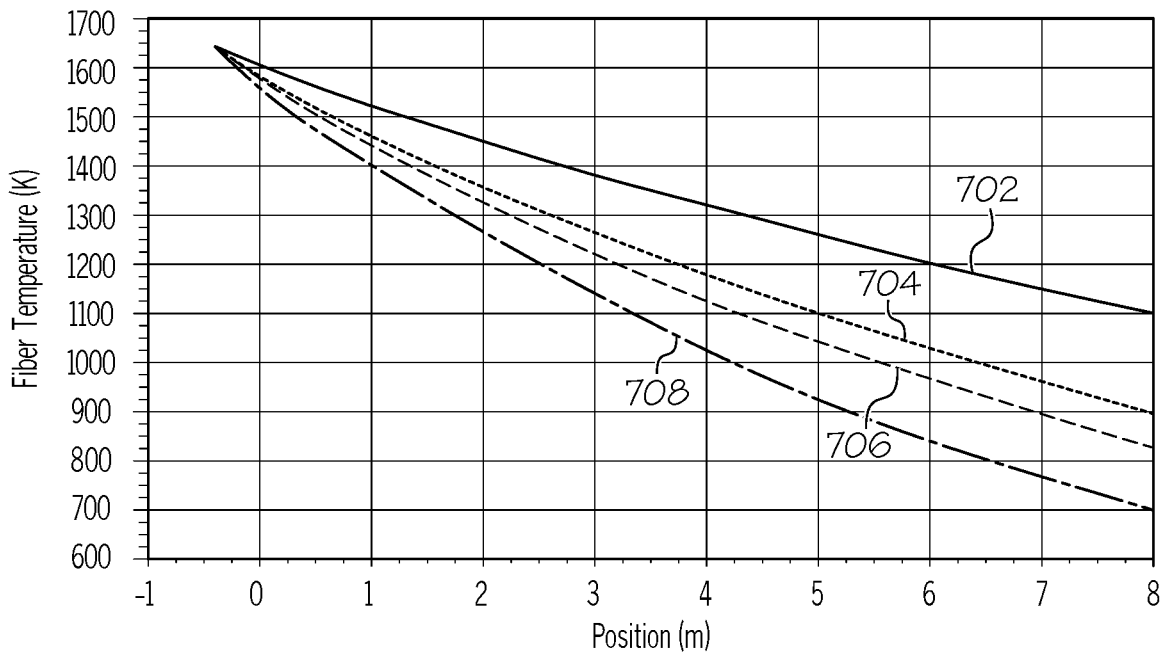
FIG. 7 graphically depicts the model-predicted optical fiber temperature (y-axis) as a function of axial position (x-axis) in a treatment device for a range of operating pressures of the treatment device, according to one or more embodiments described herein.

Referring to FIG. 7, the relationship between the temperature of the optical fiber 102 and the axial location in the treatment device 120 at various operating pressures in air is depicted. In FIG. 7, position equal to 0 m (zero meters) corresponds to the entrance 133 of the treatment zone 130. Data at positions less than 0 m indicate the fiber temperatures on the process pathway immediately upstream of the entrance 133 of the treatment zone 130 between the reheating device 110 and the entrance 133 of the treatment zone 130. In FIG. 7, reference numeral 702 corresponds to an operating pressure of 0.05 atm (5.07 kPa), reference numeral 704 corresponds to an operating pressure in the treatment device 120 of 0.4 atm (40.5 kPa), reference numeral 706 corresponds to an operating pressure in the treatment device 120 of 0.6 atm (60.8 kPa), and reference numeral 708 corresponds to an operating pressure in the treatment device 120 of 1.0 atm (101.3 kPa). As shown in FIG. 7, the temperature of the optical fiber 102 at the exit 134 (FIGS. 2-4) of the treatment zone 130 of the treatment device 120 (i.e., at 8 meters) can be increased by 400° C. by reducing the operating pressure in the treatment zone 130 of the treatment device 120 from 1 atm (101.3 kPa) to 0.05 atm (5.07 kPa).

Figure 8:
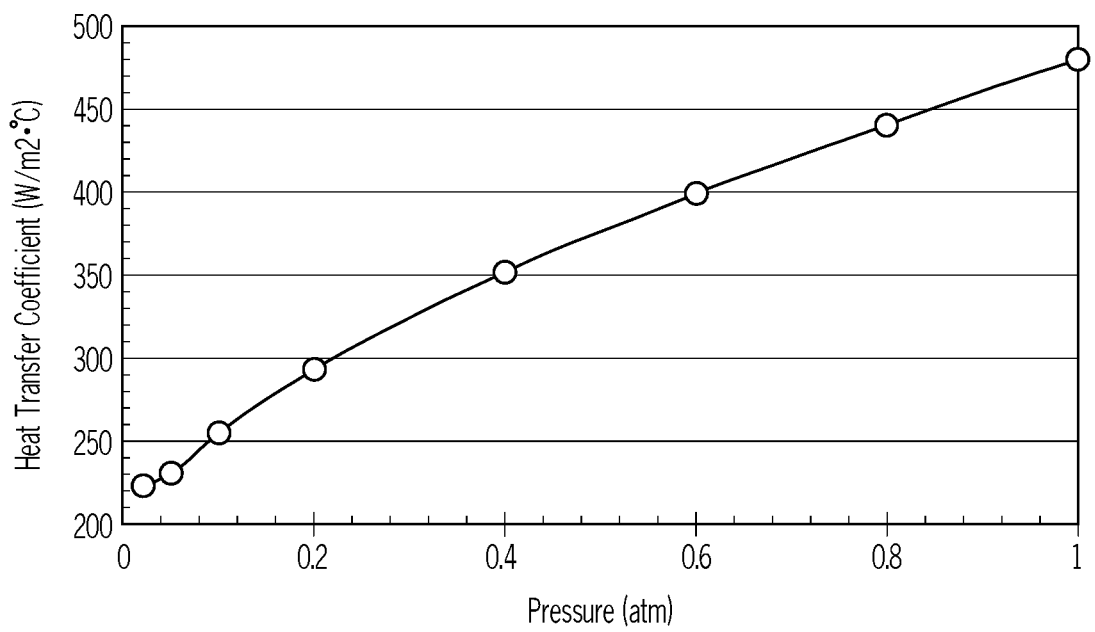
FIG. 8 graphically depicts the model-predicted heat transfer coefficient (y-axis) as a function of operating pressure (x-axis) for a treatment device having an inner diameter of 4 cm, according to one or more embodiments described herein.

Referring now to FIG. 8, the model-predicted heat transfer coefficient as a function of the operating pressure in the treatment zone 130 of the treatment device 120 is depicted for air. For the data depicted in FIG. 8, the inner diameter D of the chamber 122 of the treatment device 120 in the treatment zone 130 was set to 4 cm. As shown in FIG. 8, the heat transfer coefficient can be reduced by about 50% when the operating pressure of the treatment zone 130 of the treatment device 120 is reduced from 1 atm to 0.05 atm. FIG. 8 also shows that for low operating pressures below 0.05 atm, further reductions in the operating pressure do not provide significant additional reductions to the heat transfer coefficient. This can be further explained by reference to FIG. 9.

Figure 9:
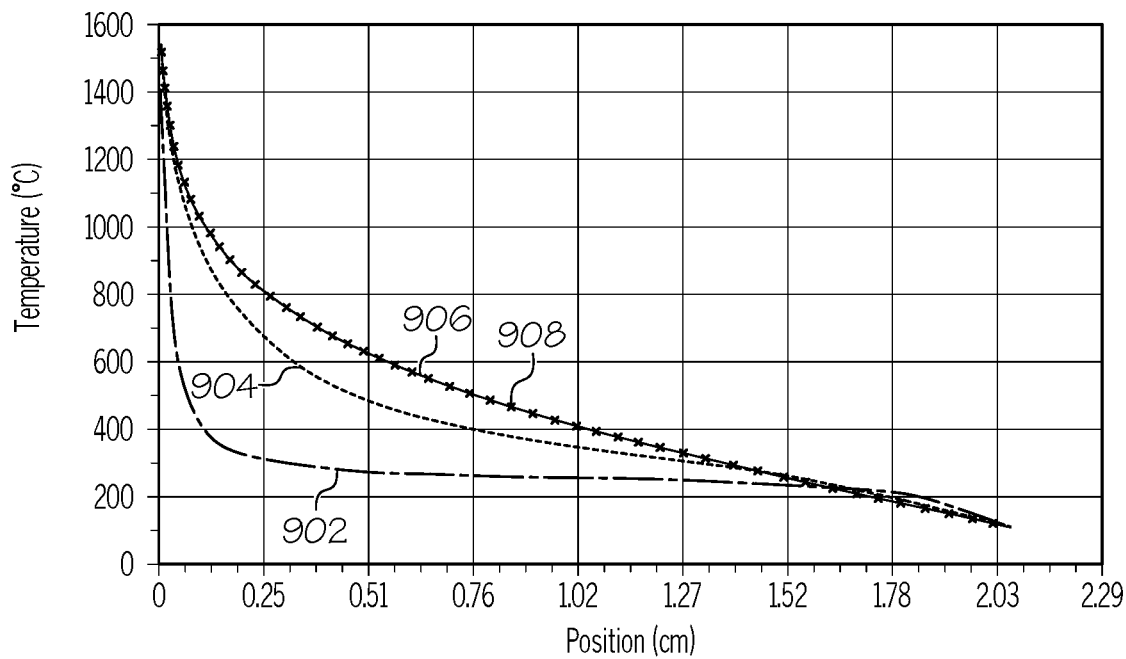
FIG. 9 graphically depicts the model-predicted temperature of air (y-axis) as a function of radial position (x-axis) for a treatment device for a range of operating pressures and for a treatment device in which heat transfer is by conduction only, according to one or more embodiments described herein.

FIG. 9 depicts the model-predicted temperature of the surrounding air (y-axis) as a function of the radial position (x-axis) within the treatment zone 130 of the treatment device 120. The temperature is determined at a distance of 1 m from the entrance 133 of the treatment zone 130. For the model used to produce the data in FIG. 9, the internal surface 128 of the treatment device 120 was maintained at 100° C. The radial position in FIG. 9 is the radial distance from the centerline of the optical fiber 102, which is assumed to be in the center of the treatment zone 130. In FIG. 9, reference numeral 902 corresponds to an operating pressure of 1 atm (101.3 kPa), reference numeral 904 corresponds to an operating pressure in the treatment device 120 of 0.1 atm (10.13 kPa), reference numeral 906 corresponds to an operating pressure in the treatment device 120 of 0.005 atm (0.507 kPa), and reference numeral 908 corresponds to heat transfer by conduction without contributions from convection. FIG. 9 shows that the thermal boundary layer thickness increases as the operating pressure is reduced. FIG. 9 also shows that, at low operating pressures below about 0.005 atm, the gas temperature profile 906 as a function of radial position in the treatment zone 130 of the treatment device 120 approaches the temperature profile produced by pure heat conduction 908 without any contribution from convection. Thus, at operating pressures of less than about 0.005 atm, conduction may become the dominant heat transfer mechanism compared to convection. Further reductions to the convective heat transfer rate through reducing the operating pressures below 0.005 atm may be negligible compared to the rate of heat transfer due to conduction at pressure less than 0.005 atm.

The rate of heat transfer away from the optical fiber 102 in the treatment zone 130 of the treatment device 120 may be further reduced by reducing the pressure below 0.001 atm (0.1013 kPa or 1.013 mbar) to reduce the thermal conductivity of air. As previously discussed herein in relation to FIG. 6, at operating pressures greater than about 0.001 atm (1.013 mbar), the thermal conductivity of air does not depend on the operating pressure. However, as shown in FIG. 6, the thermal conductivity of air decreases with decreasing pressure at operating pressures less than 0.001 atm (1.013 mbar). Therefore, the rate of heat transfer by conduction may be reduced by reducing the operating pressure in the treatment zone 130 of the treatment device 120 to less than 0.001 atm (0.1013 kPa), which reduces the thermal conductivity of air. However, in practice, reducing the operating pressure in the treatment zone 130 of the treatment device 120 to pressures less than 0.001 atm may not be feasible or may require more advanced vacuum systems or more precise dimensioning of the fiber inlet 124 and fiber outlet 126 of the treatment device 120.

In some embodiments, the rate of heat transfer away from the optical fiber 102 may be further reduced by increasing the thermal resistance to heat conduction, such as by increasing the inner diameter D of the treatment zone 130 or introducing a working gas having a thermal conductivity that is less than the thermal conductivity of air. By reducing the thermal conductivity of the working gas, the heat loss from the fiber surface due to conduction can be reduced based on the following heat conduction Equation 4 (EQU. 4):

$$Q_{conduction} = \frac{2\pi k L (T - T_\infty)}{\ln\left(\frac{R_{SCD}}{R_f}\right)} \quad \text{EQU. 4}$$

In EQU. 4, $Q_{conduction}$ is the heat flow due to conduction, $(T - T_\infty)$ is the temperature differential between the optical fiber and the internal surface 128 of the chamber 122 of the treatment device 120, k is the thermal conductivity of the working gas, L is the fiber length, $R_{SCD}$ is the radius of the internal surface 128 of the treatment chamber 122, and $R_f$ is the radius of the fiber. For example, referring to FIG. 3, in some embodiments, the rate of heat transfer from the optical fiber 102 in the treatment device 120 may be reduced by increasing the cross-sectional dimension (e.g., inner diameter D) of the treatment device 120 in the treatment zone 130. Increasing the inner diameter D of the chamber 122 in the treatment zone 130 of the treatment device 120 may increase the thermal resistance to heat conduction, which may further reduce the rate of heat transfer away from the optical fiber 102.

Figure 10:
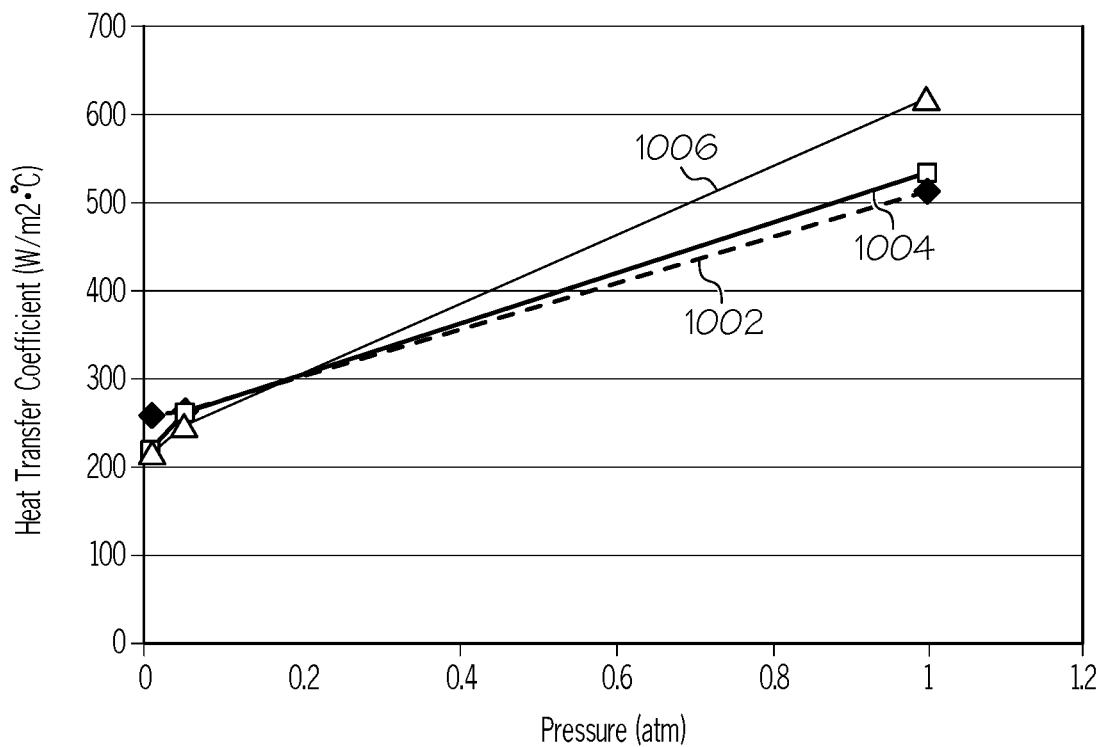
FIG. 10 graphically depicts the model-predicted heat transfer coefficient (y-axis) as a function of operating pressure (x-axis) for two treatment devices having different inner diameters in a treatment zone of the treatment devices, according to one or more embodiments described herein.
Figure 11:
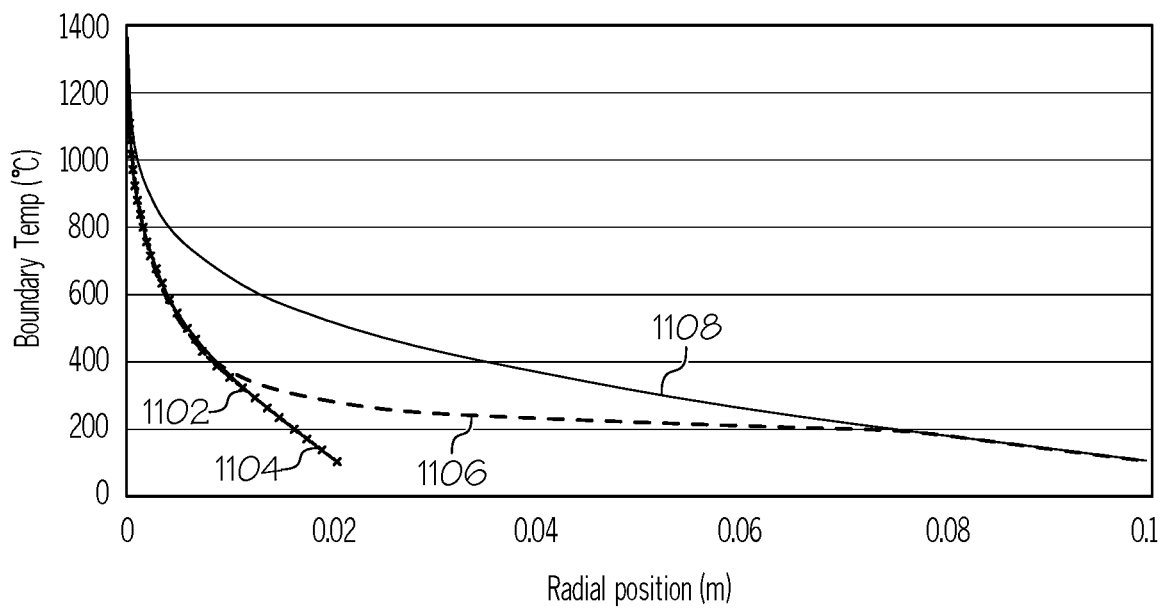
FIG. 11 graphically depicts the model-predicted boundary temperature of air (y-axis) as a function of radial position (x-axis) for treatment devices having different inner diameters in a treatment zone of the treatment devices, according to one or more embodiments described herein.

FIGS. 10 and 11 illustrate the effects of increasing the inner diameter D of the chamber 122 of the treatment device 120 in the treatment zone 130 on heat transfer away from the optical fiber. Referring to FIG. 10, the heat transfer coefficient (y-axis) is shown as a function of operating pressure (x-axis) for a treatment device having an inner diameter of 4 cm in the treatment zone (4 cm treatment device, corresponding to reference numeral 1002), a treatment device having an inner diameter of 20 cm in the treatment zone (20 cm treatment device, corresponding to reference numeral 1004), and a treatment device having an inner diameter of 40 cm in the treatment zone (40 cm treatment device, corresponding to reference numeral 1006). At greater operating pressures above about 0.5 atm (50.7 kPa), convection is the major mode of heat transfer. At operating pressures above 0.5 atm, the 4 cm treatment device exhibits a lower heat transfer coefficient and, thus, performs better compared to the 20 cm and 40 cm treatment devices. However, at reduced pressures, such as operating pressure below about 0.1 atm (10.13 kPa), conduction may become the dominant mode of heat transfer, and the 20 cm treatment device may provide the better performance. As shown in FIG. 10, at operating pressures less than about 0.1 atm, the 20 cm treatment device provides a heat transfer coefficient that is less than the heat transfer coefficient for the 4 cm treatment device. The 40 cm treatment device also exhibits a heat transfer coefficient less than the heat transfer coefficient for the 4 cm treatment device. The difference in the heat transfer coefficients at operating pressures less than about 0.1 atm for the 20 cm and 40 cm was minimal. Thus, at lower operating pressures, such as operating pressure less than about 0.1 atm, increasing the inner diameter D of the treatment device may reduce the heat transfer coefficient and, therefore, reduce the rate of heat transfer away from the optical fiber 102.

Referring to FIG. 11, the boundary temperature of the working gas (air) (y-axis) as a function of radial position in the treatment zone 130 of the treatment device 120 (x-axis) is depicted for a 4 cm treatment device and a 20 cm treatment device. For FIG. 11, the operating pressure was maintained at 0.05 atm (5.07 kPa). In FIG. 11, reference numeral 1102 refers to the radial temperature profile for the 4 cm treatment device at an operating pressure of 0.05 atm (5.07 kPa). Reference numeral 1104 refers to the conduction limit of the 4 cm treatment device, which is at an operating pressure of 0.005 atm (0.507 kPa). The conduction limit is the theoretical temperature profile of the working gas under circumstances in which heat transfer is from conduction only with no contribution from convection. Reference numeral 1106 refers to the radial temperature profile for the 20 cm treatment device at an operating pressure of 0.05 atm. Reference numeral 1108 refers to the conduction limit for the 20 cm treatment device, which is at an operating pressure of 0.005 atm. FIG. 11 shows that for the 4 cm treatment device, the thermal boundary layer fully occupies the domain between the optical fiber and the internal surface of the 4 cm treatment device, while in the 20 cm treatment device the thermal boundary layer terminates at a radial position inside the internal surface of the treatment device.

As shown in FIG. 11, the 4 cm treatment device may reach the conduction limit at an operating pressure of 0.05 atm, as shown by the radial temperature profile 1102 of the 4 cm treatment device at 0.05 atm coinciding with the conduction limit 1104 for the 4 cm treatment device at a 0.005 atm operating pressure. In contrast, for the 20 cm treatment device, the radial temperature profile 1106 at 0.05 atm is less than the conduction limit 1108 for the 20 cm treatment device at 0.005 atm. FIG. 11 shows that in the 20 cm treatment device, the thermal boundary layer continues to thicken as the operating pressure is further reduced from 0.05 atm to 0.005 atm. In other words, for the larger 20 cm treatment device, the increased inner diameter D of the 20 cm treatment device compared to the 4 cm treatment device enables a reduction in the operating pressure below 0.05 atm to further decrease the heat transfer rate away from the optical fiber 102.

Referring again to FIG. 10, at greater operating pressures (e.g., operating pressures greater than 0.1 atm (10.1 kPa), convection may become the dominant mode of heat transfer. In this case of greater operating pressures, the optical fiber 102 may lose less heat in the small diameter treatment device (i.e., the 4 cm treatment device) compared to a larger diameter treatment device. However, at lesser operating pressures (i.e., less than 0.1 atm), conduction may become the dominant mode of heat transfer, and the optical fiber 102 may lose less heat in the large diameter treatment device (i.e., the 20 cm treatment device). As shown in FIG. 10, at an operating pressure of 0.05 atm (5.07 kPa), increasing the inner diameter D of the treatment device in the treatment zone by a factor of 5 (i.e., from 4 cm to 20 cm) may provide a further reduction to the heat transfer coefficient of 2.3%. Thus, the rate of heat transfer away from the optical fiber 102 in the treatment zone 130 of the treatment device 120 may be further reduced by increasing the inner diameter D of the chamber 122 in the treatment zone 130 of the treatment device 120.

As previously discussed herein, in some embodiments, the rate of heat transfer away from the optical fiber 102 may also be further reduced by introducing a working gas having a thermal conductivity that is less than the thermal conductivity of air. As previously discussed, working gases having a thermal conductivity less than the thermal conductivity of air may include, but are not limited to, argon, xenon, krypton, other noble gas with a molecular weight greater than argon, or combinations of these.

Figure 12:
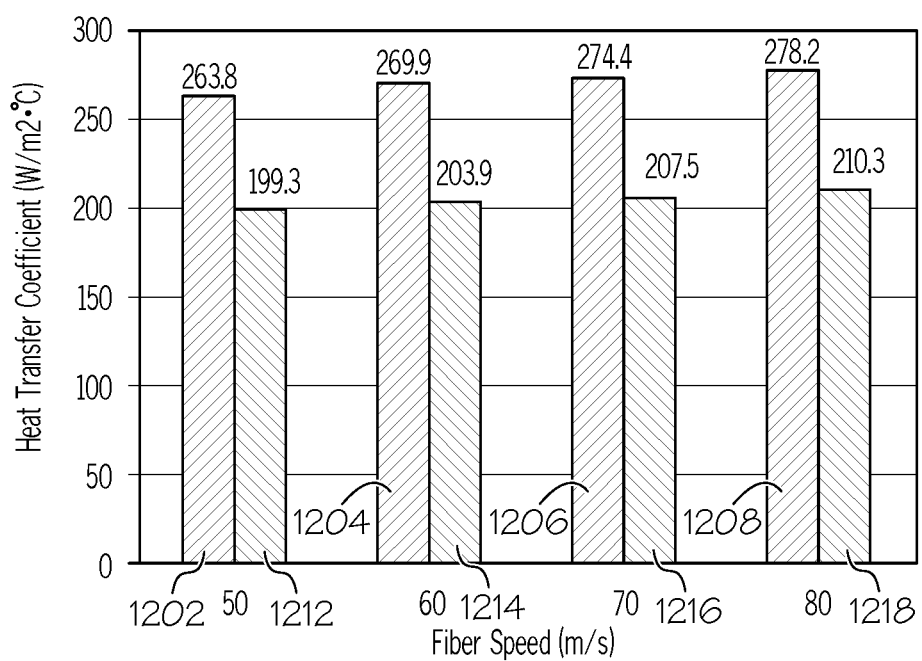
FIG. 12 graphically depicts the model-predicted heat transfer coefficient (y-axis) for argon and air as a function of draw speed of the optical fiber (x-axis), according to one or more embodiments described herein.

Referring to FIG. 12, the heat transfer coefficients determined for a 20 cm treatment device (i.e., inner diameter of 20 cm) at fiber speeds of 50 m/s, 60 m/s, 70 m/s, and 80 m/s and an operating pressure of 0.05 atm (5.07 kPa) are graphically depicted. Reference numerals 1202, 1204, 1206, and 1208 refer to the heat transfer coefficient measured with air as the working gas, and reference numerals 1212, 1214, 1216, and 1218 refer to the heat transfer coefficient measured with argon as the working gas. As shown in FIG. 12, replacing air with argon as the working gas in a 20 cm diameter treatment device operated at 0.05 atm operating pressure can provide an average reduction to the heat transfer coefficient of about 65 Watts/($m^2 \cdot °$C.) (W/($m^2 \cdot °$C.), which is a 25% reduction in the heat transfer coefficient.

Figure 13:
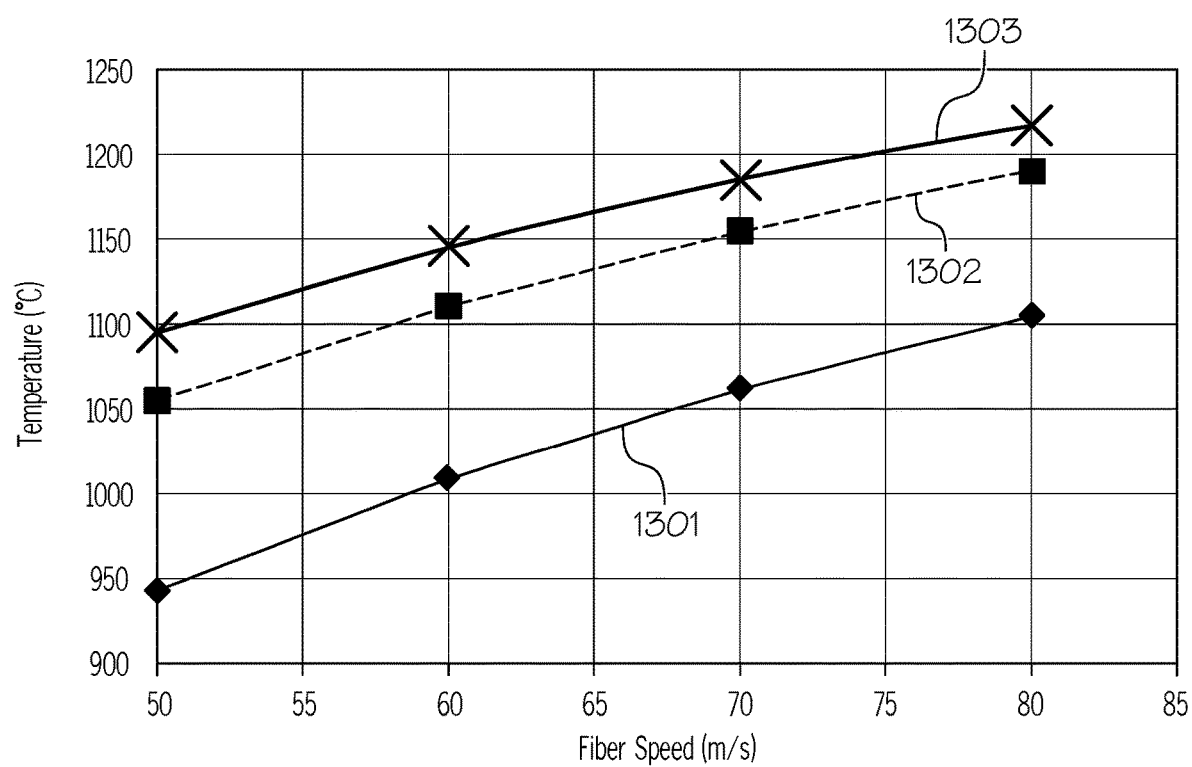
FIG. 13 graphically depicts the model-predicted temperature of the optical fiber at the exit of the treatment zone of the treatment device (y-axis) as a function of fiber draw speed (x-axis) for a treatment device having an inner diameter of 20 cm, according to one or more embodiments described herein.

Referring to FIG. 13, the exit temperature of the optical fiber 102 at the fiber outlet 126 (FIG. 4) of the treatment device 120 as a function of fiber speed (i.e., draw speed) is depicted for a 20 cm treatment device operated at an operating pressure of 0.05 atm. In FIG. 13, reference numeral 1301 refers to the exit temperature of the optical fiber measured when air is used as the working gas and in which the internal surface of the treatment device is heated to a temperature of 100° C. Reference numeral 1302 refers to the exit temperature of the optical fiber with argon used as the working gas and in which the internal surface of the treatment device is heated to a temperature of 100° C. Reference numeral 1303 refers to the exit temperature of the optical fiber with argon as the working gas and in which the internal surface of the treatment device is heated to a temperature of 300° C. As shown in FIG. 13, utilizing argon as the working gas (reference numeral 1302) in the treatment device 120 may increase the exit temperature of the optical fiber by from 85° C. to 112° C. For example, at a fiber speed of 50 m/s in FIG. 13, utilizing argon (reference numeral 1302) as the working gas may provide an increase in the exit temperature of the optical fiber of 112° C. compared to operating the treatment device with air (reference numeral 1301) as the working gas. As the fiber speed increases, the difference in exit temperature of the optical fiber with argon (reference numeral 1302) compared to air (reference numeral 1301) generally decreases due to the resultant decrease in the residence time of the optical fiber in the treatment device at the increased fiber speeds.

In some embodiments, the rate of heat transfer away from the optical fiber may be further reduced by increasing a surface temperature of the internal surface 128 of the chamber 122 in the treatment zone 130 of the treatment device 120. Increasing the surface temperature of the internal surface 128 of the chamber 122 in the treatment zone 130 may further increase the exit temperature of the optical fiber 102 at the fiber outlet 126 of the treatment device 120. For example, in some embodiments, the internal surface 128 of the chamber 122 may be heated to a surface temperature of greater than or equal to 300° C. Referring again to FIG. 13, for a 20 cm treatment device operated at an operating pressure of 0.05 atm and with argon as the working gas (reference numerals 1302 and 1303), increasing the surface temperature of the internal surface of the chamber to a temperature of 300° C. (reference numerals 1303) may increase the exit temperature of the optical fiber by 30° C. to 40° C. compared to not heating the internal surface of the chamber (reference numeral 1302). Thus, in some embodiments, the heat transfer away from the optical fiber may be further reduced by heating the internal surface 128 of the chamber 122 of the treatment device 120 in the treatment zone 130.

Referring again to FIG. 2, the optical fiber 102 may be passed out of the treatment zone 130 of the treatment device 120. The optical fiber 102 may have a fiber temperature at the exit 134 of the treatment zone 130 of the treatment device 120 of greater than or equal to 500° C., such as greater than or equal to 600° C., greater than or equal to 700° C., or greater than or equal to 900° C. For example, in some embodiments, the fiber temperature of the optical fiber 102 at the exit 134 of the treatment zone 130 of the treatment device 120 may be from 500° C. to 1700° C., from 500° C. to 1500° C., from 500° C. to 1200° C., from 500° C. to 1000° C., from 600° C. to 1700° C., from 600° C. to 1500° C., from 600° C. to 1200° C., from 600° C. to 1000° C., from 700° C. to 1700° C., from 700° C. to 1500° C., from 700° C. to 1200° C., or from 700° C. to 1000° C. In some embodiments, the optical fiber 102 may be passed through one or a plurality of second positioners 160 downstream of the treatment zone 130 of the treatment device 120. In some embodiments, the second positioner 160 may be disposed within the chamber 122 of the treatment device 120 such that positioning the optical fiber 102 downstream of the treatment zone 130 is conducted at reduced pressure. The optical fiber 102 may be passed out of the treatment device 120 through fiber outlet 126. After passing out of the treatment device 120, the optical fiber 102 may be passed to one or more downstream operations, such as coating unit 50, drawing mechanism 60, or other downstream processes.

After being treated in and passed out of the treatment device 120, the optical fiber 102 may have a fictive temperature of less than 1550° C., less than or equal to 1500° C., less than or equal to 1450° C., less than or equal to 1400° C., less than or equal to 1300° C., or less than or equal to 1200° C. In some embodiments, the optical fiber 102 treated in the treatment device 120 may exhibit signal attenuation of a 1310 nanometer (nm) wavelength signal of less than or equal to 0.70 decibels per kilometer (dB/km), less than or equal to 0.50 dB/km, less than or equal to 0.35, or even less than or equal to 0.30 dB/km. For example, in some embodiments, the optical fiber 102 treated in the treatment device 120 may exhibit signal attenuation of a 1310 nm wavelength signal of from 0.20 dB/km to 0.70 dB/km, from 0.20 dB/km to 0.5 dB/km, from 0.20 dB/km to 0.35 dB/km, from 0.20 dB/km to 0.30 dB/km, from 0.25 dB/km to 0.70 dB/km, from 0.25 dB/km to 0.50 dB/km, from 0.25 dB/km to 0.35 dB/km, or even from 0.25 dB/km to 0.30 dB/km. In some embodiments, the optical fiber 102 treated in the treatment device 120 may exhibit signal attenuation of a 1550 nm wavelength signal of less than or equal to 0.30 decibels per kilometer (dB/km), less than or equal to 0.20 dB/km, or even less than or equal to 0.16 dB/km. For example, in some embodiments, the optical fiber 102 treated in the treatment device 120 may exhibit signal attenuation of a 1550 nm wavelength signal of from 0.10 dB/km to 0.30 dB/km, from 0.10 dB/km to 0.20 dB/km, from 0.10 dB/km to 0.16 dB/km, from 0.14 dB/km to 0.30 dB/km, from 0.14 dB/km to 0.20 dB/km, or even from 0.14 dB/km to 0.16 dB/km. In some embodiments, the optical fiber 102 treated in the treatment device 120 may be an ultra-low signal attenuation fiber. Ultra-low loss fiber exhibits attenuation of less than or equal to 0.3 dB/Km in the 1310 nm wavelength and less or equal to 0.16 dB/Km in the 1550 nm wavelength.

Methods of processing an optical fiber are also disclosed. The methods of processing an optical fiber may include drawing the optical fiber from a heated glass source, reheating the optical fiber, and cooling the optical fiber under vacuum at a cooling rate less than the cooling rate of the optical fiber in air at 25° C. and 1 atm. Cooling the optical fiber under vacuum may be conducted after reheating the optical fiber. Referring to FIG. 2, as described herein, the heated glass source may include the fiber preform 22 disposed within the furnace 20. The optical fiber 102 may be drawn from the fiber preform 22. In some embodiments, the method of processing the optical fiber 102 may include positioning the optical fiber 102 before reheating the optical fiber 102. As described herein, the optical fiber 102 may be positioned by one or more positioners (e.g., first positioner 106) disposed upstream of the reheating device 110 for reheating the optical fiber 102. In some embodiments, the vacuum may have a pressure of from 0.005 atm (5.07 kPa) to 0.8 atm (81.06 kPa). For example, in some embodiments, cooling the optical fiber 102 under vacuum may be conducted at operating pressures of from 0.005 atm to 0.8 atm.

In some embodiments of the method, reheating of the optical fiber 102, positioning of the optical fiber 102, or both may be conducted under vacuum (i.e., at a reduced operating pressure of from 0.005 atm to 0.8 atm). In some embodiments, cooling the optical fiber 102 under vacuum may include passing the optical fiber 102 through a chamber 122 of a treatment device 120. The chamber 122 of the treatment device 120 may be maintained at an operating pressure of from 0.005 atm to 0.8 atm as the optical fiber 102 passes through the chamber 122. In some embodiments, the treatment device 120 may include a reheating zone 112 and a treatment zone 130 downstream of the reheating zone 112. Reheating the optical fiber 102 may include passing the optical fiber 102 through the reheating zone 112 of the treatment device 120. In some embodiments, the reheating zone 112 may include the reheating device 110 operable to reheat the optical fiber 102.

In some embodiments, the method may include increasing a cross-sectional dimension, such as the inner diameter D, of the chamber 122 in the treatment zone 130 of the treatment device 120, where increasing the cross-sectional dimension may reduce the rate of heat transfer away from the optical fiber 102 passing through the treatment zone 130. In some embodiments, at least a portion of the chamber of the treatment device 120 downstream of the reheating device 110 may have an inner diameter D of greater than or equal to 4 cm, such as from 4 cm to 20 cm. In some embodiments, the method may include reducing a temperature gradient between the treatment device 120 and the optical fiber 102 passing through the treatment device 120 by heating an internal surface 128 of the treatment device 120. For example, in some embodiments, the method may including heating the internal surface 128 of the treatment device 120 in the treatment zone 130 to a surface temperature of greater than or equal to 100° C., greater than or equal to 200° C., or greater than or equal to 300° C. In some embodiments, the method may include heating the internal surface 128 of the treatment device 120 in the treatment zone 130 to a surface temperature of from 100° C. to 1200° C., from 100° C. to 1000° C., from 100° C. to 800° C., from 100° C. to 500° C., from 200° C. to 1200° C., from 200° C. to 1000° C., from 200° C. to 800° C., from 200° C. to 500° C., from 300° C. to 1200° C., from 300° C. to 1000° C., from 300° C. to 800° C., or from 300° C. to 500° C. In some embodiments, the optical fiber 102 passed out of the treatment device 120 may have a temperature of greater than or equal to 500° C.

In some embodiments, the method may include introducing a working gas to the treatment device, the working gas having a thermal conductivity less than the thermal conductivity of air. The working gas may be any of the working gases previously described herein. For example, in some embodiments, the working gas may be argon.

In some embodiments of the method, positioning the optical fiber 102 may include passing the optical fiber 102 over at least one positioner (e.g., first positioner 106) operable to position the optical fiber 102. For example, in some embodiments, the method may include passing the optical fiber 102 over at least one fluid bearing. Positioning the optical fiber may reduce the variability in the position of the optical fiber 102 relative to the fiber inlet 124 of the treatment device 120. In some embodiments, positioning the optical fiber 102 with the positioner upstream of the reheating device 110 and treatment zone 130 of the treatment device 120 may reduce vibration of the optical fiber 102 passing into the treatment device 120, which may reduce breakage of the optical fiber 102 during processing. In some embodiments, positioning the optical fiber may include changing a direction of the process pathway of the optical fiber drawn from the heated glass source. In some embodiments, the method may include passing the optical fiber 102 through a heated slow-cooling device before positioning the optical fiber 102. In some embodiments, the method may include passing the optical fiber 102 through the heated slow-cooling device before reheating the optical fiber 102 and passing the optical fiber 102 through the treatment zone 130 of the treatment device 120.

The systems and methods described herein for processing optical fibers may enable supplemental slow cooling of the optical fiber after reheating the optical fiber downstream of the first positioner/fluid bearing. Reheating and cooling the optical fiber 102 under vacuum in the treatment device may enable further reduction of the fictive temperature of the optical fiber and resultant reduction in Rayleigh scattering by the optical fiber. The reduction in fictive temperature and Rayleigh scattering may be sufficient to produce an optical fiber having ultra-low signal loss (i.e., ultra-low signal attenuation). Additionally, the systems and methods described herein may enable increases in fiber draw speed, in particular for fiber draw speeds of greater than 50 m/s, which may enable the systems and methods to meet increasing demand for optical fiber without reducing product quality, without the need to increase the size/height of the draw tower. The aforementioned reductions in the loss attenuation of the optical fiber and increase in fiber draw speeds may be achieved without heating the treatment device to high temperatures (e.g., temperatures greater than 1000° C. for example), thus maintaining reduced energy costs, among other benefits.

Clause 1 of the description discloses:
A method for processing an optical fiber, the method comprising:
 drawing the optical fiber from a heated glass source;
 positioning the optical fiber;
 reheating the optical fiber after positioning the optical fiber; and
 cooling the optical fiber after reheating the optical fiber, wherein reheating and cooling the optical fiber are conducted under vacuum and cooling is conducted at a cooling rate less than the cooling rate of the optical fiber in air at 25° C. and 1 atm.

Clause 2 of the description discloses:
The method of clause 1, wherein the vacuum has a pressure of from 0.005 atmospheres (atm) to 0.8 atm.

Clause 3 of the description discloses:
The method of clause 1 or 2, comprising positioning the optical fiber under vacuum at a pressure of from 0.005 atm to 0.8 atm.

Clause 4 of the description discloses:
The method of clause 1 or 2, wherein cooling the optical fiber under vacuum comprises passing the optical fiber through a chamber of a treatment device, wherein the chamber is maintained at a pressure of from 0.005 atm to 0.8 atm as the optical fiber passes through the chamber.

Clause 5 of the description discloses:
The method of clause 4, wherein at least a portion of the treatment device downstream of a reheating device has an inner diameter of from 4 cm to 40 cm.

Clause 6 of the description discloses:
The method of clause 4 or 5, wherein a positioner for positioning the optical fiber is disposed within the chamber of the treatment device.

Clause 7 of the description discloses:
The method of any of clauses 4-6, further comprising reducing a temperature gradient between the treatment device and the optical fiber by heating an internal surface of the treatment device.

Clause 8 of the description discloses:
The method of any of clauses 4-7, further comprising introducing a working gas to the treatment device, the working gas having a thermal conductivity less than the thermal conductivity of air.

Clause 9 of the description discloses:
The method of clause 8, wherein the working gas is argon.

Clause 10 of the description discloses:
The method of any of clauses 4-9, wherein the optical fiber passed out of the treatment device has a temperature of greater than 500° C.

Clause 11 of the description discloses:
The method of any of clauses 1-10, wherein positioning the optical fiber comprises passing the optical fiber over at least one fluid bearing.

Clause 12 of the description discloses:
The method of any of clauses 1-10, wherein positioning the optical fiber comprises changing a direction of the process pathway of the optical fiber drawn from the heated glass source.

Clause 13 of the description discloses:
The method of any of clauses 1-12, further comprising passing the optical fiber through a heated slow-cooling device before positioning the optical fiber.

Clause 14 of the description discloses:
The method of any of clauses 1-13, wherein the drawing occurs at a speed greater than 50 m/s.

Clause 15 of the description discloses:
The method of any of clauses 1-14, wherein the heated glass source comprises silica.

Clause 16 of the description discloses:
An optical fiber produced by the method of any of clauses 1-15, wherein the optical fiber has a fictive temperature less than or equal to 1450° C.

Clause 17 of the description discloses:
A system for processing an optical fiber, the system comprising:
 a furnace having a fiber preform operable to produce an optical fiber;
 at least one positioner downstream of the furnace, the positioner operable to reduce variability in a process pathway of the optical fiber;
 a treatment device downstream of the positioner, the treatment device comprising a reheating zone and a treatment zone downstream of the reheating zone, the treatment device operable to maintain the reheating zone and the treatment zone at an operating pressure less than atmospheric pressure and to cool the optical fiber in the treatment zone under vacuum at a cooling rate less than a cooling rate of the optical fiber in air at 25° C. and 1 atm; and
 a reheating device coupled to or enclosed within the reheating zone of the treatment device.

Clause 18 of the description discloses:
The system of clause 17, wherein the treatment device is operable to maintain the optical fiber at a pressure of from 0.005 atm to 0.8 atm in the treatment zone.

Clause 19 of the description discloses:

The system of clause 17 or 18, wherein the treatment device comprises a chamber enclosing at least a portion of the process pathway of the optical fiber downstream of the reheating device.

Clause 20 of the description discloses:

The system of clause 19, wherein the chamber has an inner diameter of from 4 cm to 40 cm.

Clause 21 of the description discloses:

The system of any of clauses 17-20, wherein the treatment device encloses the positioner upstream of the reheating device.

Clause 22 of the description discloses:

The system of any of clauses 17-21, wherein the treatment device comprises a heated internal surface in the treatment zone, wherein the heated internal surface is operable to reduce a temperature gradient between the optical fiber and the treatment device.

Clause 23 of the description discloses:

The system of any of clauses 17-22, further comprising a heated slow cooling device disposed between the furnace and the positioner.

While various embodiments of the systems and methods for optical fiber processing have been described herein, it should be understood it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

As used herein, the singular forms "a," "an" and "the" include plural referents unless the context clearly dictates otherwise. Thus, for example, reference to "a" component includes aspects having two or more such components, unless the context clearly indicates otherwise.

Directional terms as used herein, such as up, down, right, left, front, back, top, bottom, are made only with reference to the figures as drawn and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

What is claimed is:

1. A method for processing an optical fiber, the method comprising:
   drawing the optical fiber from a heated glass source;
   positioning the optical fiber;
   reheating the optical fiber after the positioning the optical fiber; and
   cooling the optical fiber after the reheating the optical fiber, wherein the reheating and the cooling the optical fiber are conducted under vacuum and the cooling is conducted at a cooling rate less than a cooling rate of the optical fiber in air at 25° C. and 1 atm.

2. The method of claim 1, wherein the vacuum has a pressure of from 0.005 atmospheres (atm) to 0.8 atm.

3. The method of claim 1, the positioning the optical fiber occurs under vacuum at a pressure of from 0.005 atm to 0.8 atm.

4. The method of claim 1, wherein the cooling the optical fiber comprises passing the optical fiber through a chamber of a treatment device, wherein the chamber is maintained at a pressure of from 0.005 atm to 0.8 atm as the optical fiber passes through the chamber.

5. The method of claim 4, wherein at least a portion of the treatment device downstream of a reheating device has an inner diameter of from 4 cm to 40 cm.

6. The method of claim 4, wherein a positioner for the positioning the optical fiber is disposed within the chamber of the treatment device.

7. The method of claim 4, further comprising reducing a temperature gradient between the treatment device and the optical fiber by heating an internal surface of the treatment device.

8. The method of claim 4, further comprising introducing a working gas to the treatment device, the working gas having a thermal conductivity less than the thermal conductivity of air.

9. The method of claim 8, wherein the working gas is argon.

10. The method of claim 4, wherein the optical fiber passed out of the treatment device has a temperature of greater than 500° C.

11. The method of claim 1, wherein the positioning the optical fiber comprises passing the optical fiber over at least one fluid bearing.

12. The method of claim 1, wherein the positioning the optical fiber comprises changing a direction of the process pathway of the optical fiber drawn from the heated glass source.

13. The method of claim 1, further comprising passing the optical fiber through a heated slow-cooling device before the positioning the optical fiber.

14. The method of claim 1, wherein the drawing occurs at a speed greater than 50 m/s.

15. The method of claim 1, wherein the heated glass source comprises silica.

16. An optical fiber produced by the method of claim 1, wherein the optical fiber has a fictive temperature less than or equal to 1450° C.

* * * * *

UNITED STATES PATENT AND TRADEMARK OFFICE
CERTIFICATE OF CORRECTION

PATENT NO. : 11,097,976 B2
APPLICATION NO. : 16/418075
DATED : August 24, 2021
INVENTOR(S) : Yacob Mesfin Argaw et al.

Page 1 of 1

It is certified that error appears in the above-identified patent and that said Letters Patent is hereby corrected as shown below:

On the Title Page

On page 2, in Column 1, item (56), Other Publications, Line 2, delete "(2005." and insert -- (2005). --, therefor.

On page 2, in Column 1, item (56), Other Publications, Line 4, delete "(2000." and insert -- (2000). --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*